United States Patent
Choi

(10) Patent No.: US 11,450,063 B2
(45) Date of Patent: Sep. 20, 2022

(54) METHOD AND APPARATUS FOR TRAINING OBJECT DETECTION MODEL

(71) Applicant: SAMSUNG ELECTRONICS CO., LTD., Suwon-si (KR)

(72) Inventor: Hee-min Choi, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 467 days.

(21) Appl. No.: 16/542,971

(22) Filed: Aug. 16, 2019

(65) Prior Publication Data
US 2020/0066036 A1 Feb. 27, 2020

(30) Foreign Application Priority Data
Aug. 21, 2018 (KR) .................. 10-2018-0097170

(51) Int. Cl.
| | | |
|---|---|---|
| G06K 9/00 | (2022.01) | |
| G06T 17/10 | (2006.01) | |
| G06T 7/73 | (2017.01) | |
| G06T 7/246 | (2017.01) | |
| G06N 3/02 | (2006.01) | |
| G06V 10/75 | (2022.01) | |
| G06V 20/64 | (2022.01) | |

(52) U.S. Cl.
CPC .............. *G06T 17/10* (2013.01); *G06N 3/02* (2013.01); *G06T 7/251* (2017.01); *G06T 7/75* (2017.01); *G06V 10/7515* (2022.01); *G06V 20/653* (2022.01); *G06T 2207/10028* (2013.01); *G06T 2207/20081* (2013.01); *G06T 2210/12* (2013.01)

(58) Field of Classification Search
CPC .......... G06T 17/10; G06T 7/75; G06T 7/251; G06T 2207/10028; G06T 19/20; G06K 9/00214; G06K 9/6203; G06N 3/02; H04N 13/00; G06B 19/00
See application file for complete search history.

(56) References Cited

U.S. PATENT DOCUMENTS

| | | |
|---|---|---|
| 7,643,685 B2 | 1/2010 | Miller |
| 8,439,683 B2 | 5/2013 | Puri et al. |
| 9,438,878 B2 | 9/2016 | Niebla, Jr. et al. |
| 9,792,501 B1 | 10/2017 | Maheriya et al. |
| 9,904,867 B2 | 2/2018 | Fathi et al. |
| 9,916,695 B2 | 3/2018 | Chen et al. |
| 10,304,191 B1 * | 5/2019 | Mousavian ............... G06T 7/50 |
| 2017/0024634 A1 | 1/2017 | Miao et al. |

(Continued)

FOREIGN PATENT DOCUMENTS

| | | |
|---|---|---|
| KR | 10-2017-0135758 A | 12/2017 |
| KR | 10-1822373 B1 | 3/2018 |

OTHER PUBLICATIONS

Mousavian et al., "3D Bounding Box Estimation Using Deep Learning and Geometry", Apr. 10, 2017, 10 pages total (arXiv:1612. 00496v2 [cs.CV]).

(Continued)

*Primary Examiner* — Oneal R Mistry
(74) *Attorney, Agent, or Firm* — Sughrue Mion, PLLC

(57) ABSTRACT

An object detection training method and apparatus are provided. The object detection training apparatus determines a pose and a dimension of an object, and a bounding box at various viewpoints from an input image based on an object detection model, and trains the object detection model based on a loss.

18 Claims, 15 Drawing Sheets

(56) References Cited

U.S. PATENT DOCUMENTS

| | | | |
|---|---|---|---|
| 2018/0024641 A1 | 1/2018 | Mao et al. | |
| 2018/0122082 A1 | 5/2018 | Mukherjee et al. | |
| 2018/0144496 A1 | 5/2018 | Posner et al. | |
| 2018/0268601 A1* | 9/2018 | Rad | G06T 7/75 |
| 2019/0079526 A1* | 3/2019 | Vallespi-Gonzalez | G01S 17/931 |
| 2019/0147221 A1* | 5/2019 | Grabner | G06T 7/75 |
| | | | 382/103 |
| 2019/0213420 A1* | 7/2019 | Karyodisa | G06V 20/41 |
| 2019/0251358 A1* | 8/2019 | Khosla | G06V 10/454 |
| 2019/0317519 A1* | 10/2019 | Chen | G05D 1/0246 |
| 2021/0133461 A1* | 5/2021 | Ren | G06T 7/11 |

OTHER PUBLICATIONS

Ku et al., "Joint 3D Proposal Generation and Object Detection from View Aggregation", Mar. 6, 2018, 8 pages total (arXiv:1712.02294v3 [cs.CV]).

* cited by examiner

400

METHOD AND APPARATUS FOR TRAINING OBJECT DETECTION MODEL

CROSS-REFERENCE TO RELATED APPLICATIONS

This application claims benefit under 35 USC § 119(a) of Korean Patent Application No. 10-2018-0097170, filed on Aug. 21, 2018, in the Korean Intellectual Property Office, the entire disclosure of which is incorporated herein by reference for all purposes.

BACKGROUND

1. Field

The following description relates to a technology of training an object detection model.

2. Description of Related Art

Recently, to address an issue of classifying an input pattern as a predetermined group, research is being actively conducted on trying to apply an efficient pattern recognition method of humans to an actual computer. The research includes research on an artificial neural network (ANN) that is obtained by modeling characteristics of human biological neurons by mathematical expressions. To address the above issue, the ANN employs an algorithm that mimics learning abilities of humans. The ANN generates mapping between input patterns and output patterns using the algorithm, which indicates that the ANN has a learning capability. Also, the ANN has a generalization capability to generate a relatively correct output with respect to an input pattern that has not been used for training based on a training result.

For example, an autonomous vehicle may detect an object in front of the autonomous vehicle using an ANN.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In some embodiments provided herein, an object detection training method is provided. In some embodiments, the method includes estimating a pose and a dimension of an object based on a feature extracted from an input image, using an object detection model; calculating a three-dimensional (3D) bounding box from the pose and the dimension; determining a first output bounding box corresponding to the object by projecting the 3D bounding box to a first projection image; determining a second output bounding box corresponding to the object by projecting the 3D bounding box to a second projection image; and training the object detection model based on the pose, the dimension, the first output bounding box and the second output bounding box, the training comprising a fusion operation over the first output bounding box and the second output bounding box.

In some embodiments of the method, the determining of the first output bounding box comprises determining a bird's eye view bounding box corresponding to the object by projecting the 3D bounding box to a bird's eye view projection image.

In some embodiments of the method, the determining of the second output bounding box comprises determining a perspective bounding box corresponding to the object by projecting the 3D bounding box to a perspective projection image.

In some embodiments of the method, the estimating of the pose and the dimension of the object comprises extracting features from i) a two-dimensional (2D) bounding box corresponding to the object detected from the input image and ii) a crop image corresponding to the 2D bounding box.

In some embodiments of the method, the training of the object detection model includes: calculating a loss based on the pose, the dimension, the first output bounding box and the second output bounding box; and training the object detection model based on the loss, the training comprising updating weights in a neural network.

In some embodiments of the method, the calculating of the loss comprises: calculating a first loss based on a degree of overlap between the first output bounding box and a first reference bounding box; and calculating a second loss based on a degree of overlap between the second output bounding box and a second reference bounding box.

In some embodiments of the method, the calculating of the loss comprises: determining a target box based on a front face box indicating a front face of the object; and calculating a loss of a perspective bounding box based on a degree of overlap between the target box and a reference box.

In some embodiments of the method, the estimating of the pose and the dimension of the object comprises: estimating a location offset based on the feature extracted from the input image; estimating an initial location from the pose and the dimension; determining an output location by applying the location offset to the estimated initial location; and the calculating the loss is based on the determined output location.

In some embodiments of the method, the estimating of the pose and the dimension comprises estimating a confidence level of each of the estimated pose and the estimated dimension based on the feature extracted from the input image.

In some embodiments of the method, the estimating of the dimension of the object comprises estimating a width, a length and a height of the object.

Also provided is an additional object detection training method including: estimating, using an object detection model, a pose of an object based on features extracted from both an input image and a depth image; estimating a three-dimensional (3D) bounding box corresponding to the object based on the features extracted from both the input image and the depth image, using the object detection model; determining an output bounding box corresponding to the object by projecting the 3D bounding box to a projection image; and training the object detection model based on the pose, the 3D bounding box and the output bounding box, the training comprising a fusion operation over the 3D bounding box and the output bounding box.

the determining of the output bounding box comprises determining a perspective bounding box corresponding to the object by projecting the 3D bounding box to a perspective projection image.

In some embodiments of the additional object detection method, the extracting the features from both the input image and the depth image is based on a region calculated by a region proposal network (RPN).

In some embodiments of the additional object detection method, the training of the object detection model comprises: calculating a loss based on the pose, the 3D bounding box and the output bounding box; and training the object detection model based on the loss, the training comprising updating weights in a neural network.

In some embodiments of the additional object detection method, the calculating of the loss comprises calculating a loss of the output bounding box based on a degree of overlap between the output bounding box and a reference bounding box.

In some embodiments of the additional object detection method, the calculating of the loss comprises: determining, from a perspective bounding box corresponding to the object, a target box based on a front face box indicating a front face of the object; and calculating a loss of the perspective bounding box based on a degree of overlap between the target box and a reference box.

In some embodiments of the additional object detection method, the estimating of the pose and the 3D bounding box comprises estimating a location of a point that at least partially defines the 3D bounding box.

In some embodiments of the additional object detection method, the estimating of the pose and the 3D bounding box is based on a depth image corresponding to a bird's eye view.

In some embodiments of the additional object detection method, the fusion operation over the first output bounding box and the second output bounding box comprises extracting a feature by identifying a feature obtained both by cropping the first output bounding box and obtained by cropping the second output bounding box.

Also provided herein is an object detection training apparatus comprising: a memory configured to store an object detection model; and a processor configured to: estimate a pose and a dimension of an object based on a feature extracted from an input image, using the object detection model, calculate a a three-dimensional (3D) bounding box from the pose and the dimension, determine a first output bounding box corresponding to the object by projecting the 3D bounding box to a first projection image, determine a second output bounding box corresponding to the object by projecting the 3D bounding box to a second projection image, and train the object detection model based on the pose, the dimension, the first output bounding box and the second output bounding box, and further based on a fusion operation over the first output bounding box and the second output bounding box.

In one general aspect, a object detection training method includes estimating a pose and a dimension of an object based on a feature extracted from an input image, using an object detection model, determining a first output bounding box corresponding to the object by projecting a three-dimensional (3D) bounding box calculated from the pose and the dimension to a first projection image, determining a second output bounding box corresponding to the object by projecting the calculated 3D bounding box to a second projection image, and training the object detection model based on the pose, the dimension, the first output bounding box and the second output bounding box.

The determining of the first output bounding box may include determining a bird's eye view bounding box corresponding to the object by projecting the calculated 3D bounding box to a bird's eye view projection image.

The determining of the second output bounding box may include determining a perspective bounding box corresponding to the object by projecting the calculated 3D bounding box to a perspective projection image.

The estimating of the pose and the dimension of the object may include extracting features from a two-dimensional (2D) bounding box corresponding to the object detected from the input image and a crop image corresponding to the 2D bounding box, based on the object detection model.

The training of the object detection model may include calculating a loss based on the pose, the dimension, the first output bounding box and the second output bounding box, and training the object detection model based on the calculated loss.

The calculating of the loss may include calculating a loss of the first output bounding box based on a degree of overlap between the first output bounding box and a first reference bounding box, and calculating a loss of the second output bounding box based on a degree of overlap between the second output bounding box and a second reference bounding box.

The calculating of the loss may include determining a target box based on a front face box indicating a front face of the object and a rear face box indicating a rear face of the object from a perspective bounding box corresponding to the object, and calculating a loss of the perspective bounding box based on a degree of overlap between the target box and a reference box.

The estimating of the pose and the dimension of the object may include further estimating a location offset from the estimated feature, and estimating an initial location from the pose and the dimension, and determining an output location by applying the location offset to the estimated initial location. The calculating of the loss may include calculating the loss, further based on the determined output location.

The estimating of the pose and the dimension of the object may include estimating a confidence level of each of the estimated pose and the estimated dimension from the extracted feature.

The estimating of the pose and the dimension of the object may include estimating a width, a length and a height of the object as the dimension.

In another general aspect, an object detection training method includes estimating a pose of an object and a 3D bounding box corresponding to the object based on features extracted from an input image and a depth image, using an object detection model, determining an output bounding box corresponding to the object by projecting the 3D bounding box to a projection image, and training the object detection model based on the pose, the 3D bounding box and the output bounding box.

The determining of the output bounding box may include determining a perspective bounding box corresponding to the object by projecting the 3D bounding box to a perspective projection image.

The estimating of the pose and the 3D bounding box may include extracting features from the input image and the depth image based on a region calculated by a region proposal network (RPN).

The training of the object detection model may include calculating a loss based on the pose, the 3D bounding box and the output bounding box, and training the object detection model based on the calculated loss.

The calculating of the loss may include calculating a loss of the output bounding box based on a degree of overlap between the output bounding box and a reference bounding box.

The calculating of the loss may include determining a target box based on a front face box indicating a front face of the object and a rear face box indicating a rear face of the object from a perspective bounding box corresponding to the object, and calculating a loss of the perspective bounding box based on a degree of overlap between the target box and a reference box.

The estimating of the pose and the 3D bounding box may include estimating a location of a point that defines the 3D bounding box.

The estimating of the pose and the 3D bounding box may include acquiring the depth image corresponding to a bird's eye view.

In another general aspect, an object detection training apparatus includes a memory configured to store an object detection model, and a processor configured to estimate a pose and a dimension of an object based on a feature extracted from an input image, using the object detection model, to determine a first output bounding box corresponding to the object by projecting a 3D bounding box calculated from the pose and the dimension to a first projection image, to determine a second output bounding box corresponding to the object by projecting the calculated 3D bounding box to a second projection image, and to train the object detection model based on the pose, the dimension, the first output bounding box and the second output bounding box.

Other features and aspects will be apparent from the following detailed description, the drawings, and the claims.

Figure 1:
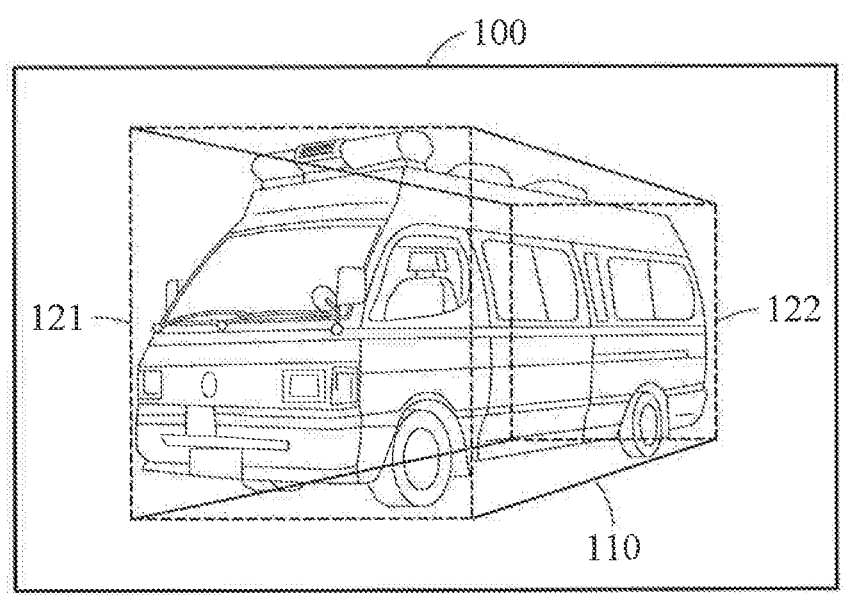
FIG. 1 illustrates an example of a bounding box for an object detection.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Various modifications may be made to the following examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, and like reference numerals in the drawings refer to like elements throughout.

FIG. 1 illustrates an example of a bounding box for an object detection.

An object detection apparatus detects an object from an image 100 based on an object detection model. The object detection model is a model trained to output information associated with a location, a size and a pose of the object from the image 100, and will be further described below.

The object detection apparatus acquires the image 100 using a sensor. The sensor is configured to sense an intensity of a signal (for example, light or an electromagnetic wave) reflected from a background or an object located around the object detection apparatus (for example, a front side of the object detection apparatus). For example, the object detection apparatus acquires a color image, an infrared image, or a depth image using the sensor. The color image includes a plurality of color channel images, and includes, for example, a red color image indicating an intensity corresponding to a red wavelength of visible light, a green color image indicating an intensity corresponding to a green wavelength, and a blue color image indicating an intensity corresponding to a blue wavelength. The infrared image represents an intensity corresponding to infrared rays received by the sensor. The depth image represents a depth (for example, a distance) to an arbitrary target point. The depth image is acquired by, for example, a light detection and ranging (LiDAR) sensor.

FIG. 1 illustrates a bounding box that is a result of an object detection. In FIG. 1, the bounding box indicates an object detected from a two-dimensional (2D) image (for example, a color image or a black-and-white image). Object detection is carried out by feature extraction. For example, features such as headlights, wheels, windshield and doors of a vehicle, see FIG. 1, may be recognized using feature extraction. Based on extracted features, a single vehicle may be detected. A bounding box is then a box surrounding the detected vehicle in an image. For example, particular features of a vehicle may be identified and listed in a feature vector. An example of a feature vector is item 1321 of FIG. 13 (described below in the discussion of FIG. 13). A smallest rectangular prism including all elements of the feature vector is a 3D bounding box, see FIG. 1 item 110. A projection of the 3D bounding box onto a 2D plane is a 2D bounding box, see items 121 and 122 of FIG. 1.

The object detection apparatus estimates a size, a location and a pose (orientation) of a bounding box that includes an object in a three-dimensional (3D) space from the image 100. The 3D space is a physical environment in which the object detection apparatus exists. For example, when the object detection apparatus is installed in a vehicle, the 3D space is a space around the vehicle.

A bounding box is a box including an object. In FIG. 1, a 3D bounding box 110 has an arbitrary shape, for example, a rectangular shape, and includes a space occupied by an object in the 3D space. For example, the 3D bounding box 110 is a minimum bounding box that is defined so that a size of the 3D bounding box 110 is minimized while each of faces of the 3D bounding box 110 is in contact with a portion of the object. When the object is a vehicle, a front side and a rear side of the vehicle are in contact with a front face 121 and a rear face 122 of the 3D bounding box 110, respectively. Also, a top side and a bottom side of the vehicle may be in contact with a top face and a bottom face of the 3D bounding box 110, respectively. A side of the vehicle may be in contact with a side face of the 3D bounding box 110.

In an example, the object detection apparatus estimates coordinates of each of vertices of the 3D bounding box 110 in the 3D space based on an object detection model. An object detection model may be implemented using a neural network, see FIG. 4. In another example, the object detection apparatus estimates a pose, a dimension and a reference point (for example, a central point, or an arbitrary vertex) of the 3D bounding box 110. The dimension includes, for example, a height, a width and a length of an object. In an example of autonomous driving or driving assistance, a preceding object may be mainly a vehicle, and the front face 121 and the rear face 122 of the 3D bounding box 110 detected from the image 100 may be primarily utilized.

The object detection apparatus detects an object from an image based on an object detection model that is completely trained. For example, the object detection apparatus determines a bounding box (for example, the 3D bounding box 110) corresponding to an object. An object detection training apparatus trains an object detection model based on training data. Hereinafter, an example of an operation of an object detection training apparatus to train an object detection model will be described.

Figure 2:
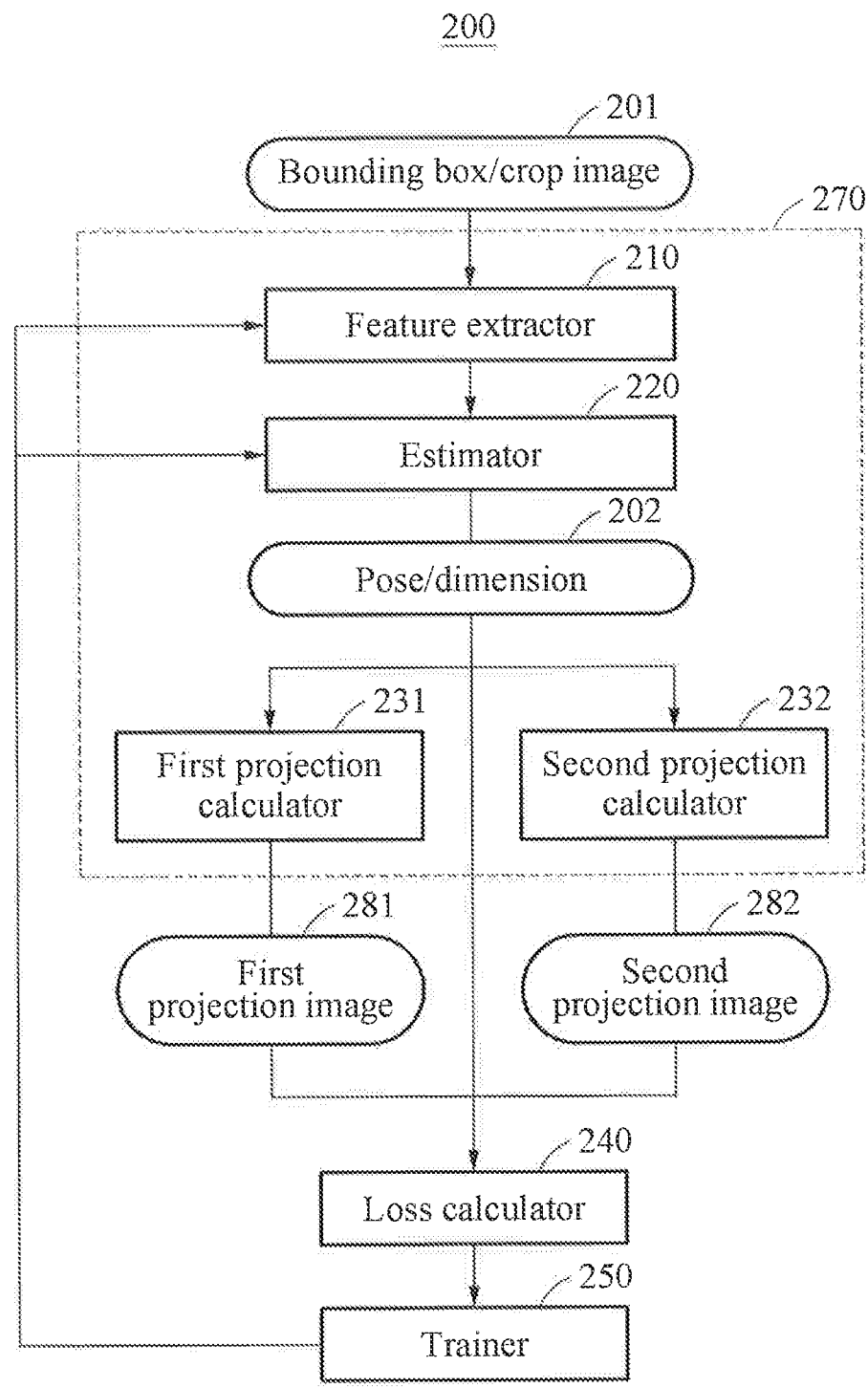
FIG. 2 is a block diagram illustrating an example of an object detection training apparatus.

FIG. 2 is a block diagram illustrating an example of an object detection training apparatus 200.

The object detection training apparatus 200 includes a feature extractor 210, an estimator 220, a first projection calculator 231, a second projection calculator 232, a loss calculator 240, and a trainer 250. An object detection model 270 may include the feature extractor 210, the estimator 220, the first projection calculator 231, and the second projection calculator 232.

The feature extractor 210 may segment an image into a grid. The grid may be composed of cells. Within the cells, objects may appear as simple geometric shapes.

The feature extractor 210 extracts a feature from an image. For example, the feature extractor 210 includes at least one convolutional layer of a neural network. The feature extractor 210 extracts a feature obtained by abstracting the image from a bounding box and crop image 201. An input bounding box is a 2D bounding box and is acquired by a preceding operation of detecting a 2D bounding box of an object from an input image. The crop image is a partial image corresponding to the 2D bounding box in the input image.

The estimator 220 estimates a pose and dimension 202 of the object based on the extracted feature. For example, the estimator 220 may compare the extracted features from feature extractor 210 with information of a candidate vehicle. The estimator 220 estimates the pose and dimension 202 from the extracted feature using a regression analysis. A dimension of the object is information indicating a size of the object, and includes, for example, a height, a width and a length of the object. The estimator 220 estimates a height, a width and a length of a 3D bounding box including the object, as a dimension of the object. Also, the estimator 220 estimates a pose of the 3D bounding box including the object, as a pose of the object. The pose of the 3D bounding box is information indicating an orientation of the object, and is represented by, for example, an angular difference between a direction from a sensor towards a central portion of the object and a movement direction of the object. However, the pose and the dimension of the object are not limited to the above description.

In the present disclosure, the sensor includes, for example, a sensor used to collect training data as well as a sensor mounted in the object detection apparatus. For example, the above-described direction from the sensor towards the central portion of the object is a direction from a sensor corresponding to a viewpoint from which an input image is acquired towards the central portion of the object. In the following description, a location relationship associated with the sensor is a location relationship between an object and a sensor corresponding to a viewpoint from which an input image or a depth image is acquired, instead of a viewpoint at which training is performed.

The first projection calculator 231 calculates a first projection image 281 from the pose and dimension 202. For example, the first projection calculator 231 determines a first output bounding box corresponding to the object by projecting a 3D bounding box calculated from the pose and dimension 202 to the first projection image 281. The first projection image 281 is a projection image that represents an object observed from a first viewpoint. The first viewpoint is, for example, a bird's eye view, and the first projection image 281 is a bird's eye view projection image. The bird's eye view projection image will be further described below with reference to FIG. 6. The first output bounding box is a 2D bounding box determined as a portion corresponding to the object in the first projection image 281.

For example, the first projection calculator 231 estimates a location of the 3D bounding box using an optimization scheme that is based on a projective geometry. The projective geometry indicates that a 3D bounding box of an object needs to be tightly fitted to a 2D bounding box (for example, the input bounding box of FIG. 2) of the object when the 3D bounding box is projected to a 2D image.

The optimization scheme based on the projective geometry is interpreted as a problem of determining four lines of a 2D bounding box using eight points of a 3D bounding box. A maximum of "84" combinations are acquired to determine four lines with eight points. However, because a vehicle, that is, an object is arranged along a road side, a roll and a pitch among the roll, the pitch and a yaw in an orientation of the object are assumed to be "0" and a maximum of "64" combinations are possible. Thus, when an error occurs in a 2D bounding box detected from an input image, an error in a 3D bounding box increases.

The second projection calculator 232 determines a second output bounding box corresponding to the object by projecting a 3D bounding box of the object to a second projection image 282. The second projection image 282 is a projection image when the object is observed from a second viewpoint. The second viewpoint is, for example, a perspective view, and the second projection image 282 is a perspective projection image. The perspective projection image will be further described below with reference to FIG. 6. The second output bounding box is a 2D bounding box determined as a portion corresponding to the object in the second projection image 282.

For example, the object detection training apparatus 200 integrates the first projection calculator 231 and the second projection calculator 232 with the object detection model 270, and trains the object detection model 270 based on a result, such as the first projection image 281 and the second projection image 282. Thus, the object detection training apparatus 200 reflects a physical location relationship of a projected object and 3D information of the object to the object detection model 270. As a result, it is possible to minimize an error in the 3D bounding box.

The loss calculator 240 calculates a loss corresponding to each of the pose and dimension 202, the first projection image 281, and the second projection image 282. For example, the loss calculator 240 individually calculates a loss of a dimension, a loss of a pose, a loss of the first projection image 281 and a loss of the second projection image 282, integrates the losses, and calculates a total loss of the object detection model 270.

The trainer 250 trains the object detection model 270 based on the calculated loss. For example, the trainer 250 updates parameters of the object detection model 270 so that the total loss converges to an arbitrary value. For example, the calculated loss may be calculated as a mean square error value in comparison with reference data. When the mean square error value falls below a target minimum, the object detection model 270 is considered to have converged. The trainer 250 updates parameters of the object detection model 270 to minimize the total loss based on a design of an objective function indicating the total loss, however, examples are not limited thereto. An example of training of the object detection model 270 and a structure of the object detection model 270 will be further described below with reference to FIG. 4.

Figure 3:
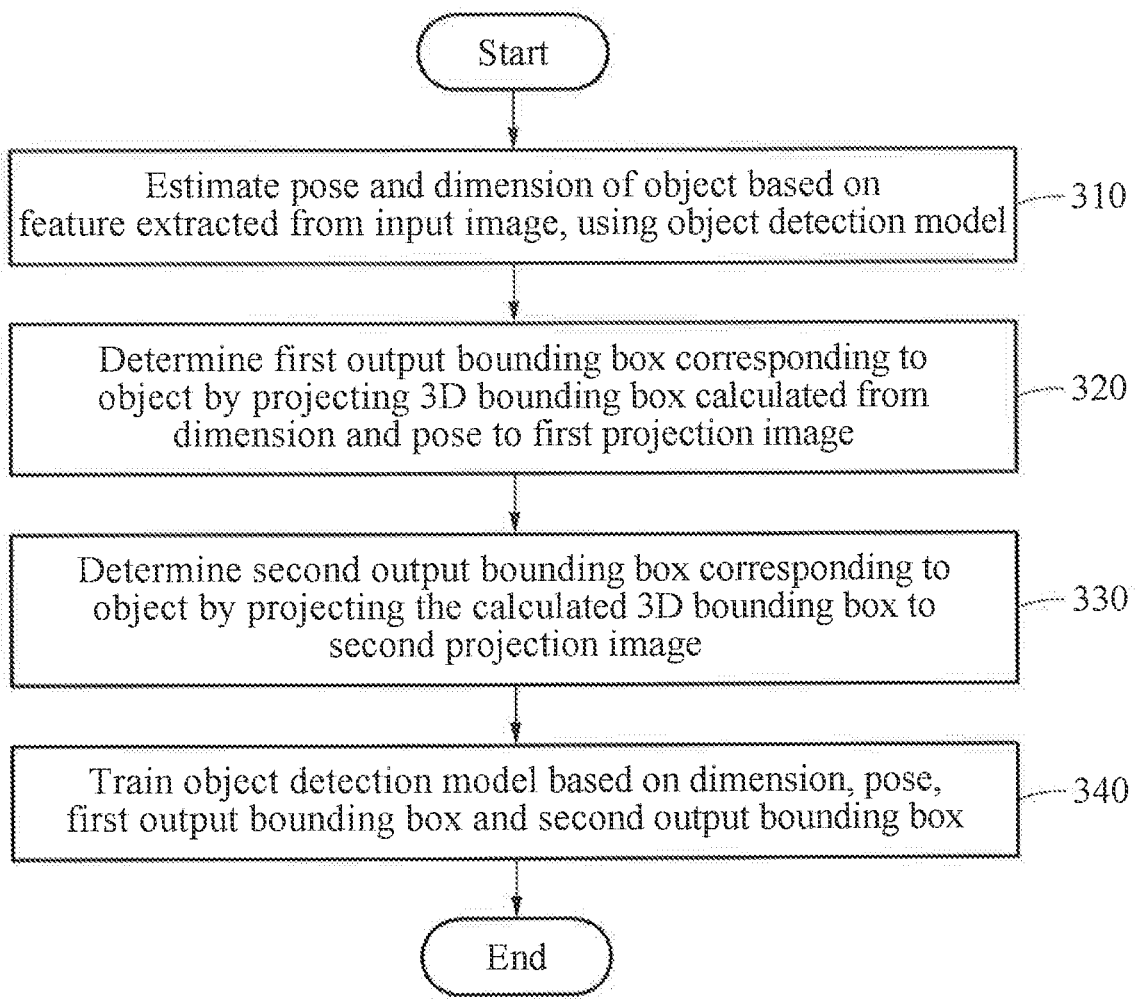
FIG. 3 is a flowchart illustrating an example of an object detection training method.

FIG. 3 is a flowchart illustrating an example of an object detection training method.

Referring to FIG. 3, in operation 310, an object detection training apparatus estimates a pose and a dimension of an object based on a feature extracted from an input image, using an object detection model. For example, the object detection training apparatus extracts features from a 2D bounding box corresponding to the object detected from the input image and a crop image corresponding to the 2D bounding box, based on the object detection model.

In operation 320, the object detection training apparatus determines a first output bounding box corresponding to the object by projecting a 3D bounding box calculated from the pose and the dimension to a first projection image. For example, the object detection training apparatus determines a bird's eye view bounding box corresponding to the object by projecting the calculated 3D bounding box to a bird's eye view projection image.

In operation 330, the object detection training apparatus determines a second output bounding box corresponding to the object by projecting the calculated 3D bounding box to a second projection image. For example, the object detection training apparatus determines a perspective bounding box corresponding to the object by projecting the calculated 3D bounding box to a perspective projection image.

In operation 340, the object detection training apparatus trains the object detection model based on the pose, the dimension, the first output bounding box and the second output bounding box. For example, the object detection training apparatus calculates a loss based on the pose, the dimension, the first output bounding box and the second output bounding box. The object detection training apparatus trains the object detection model based on the calculated loss.

Figure 4:
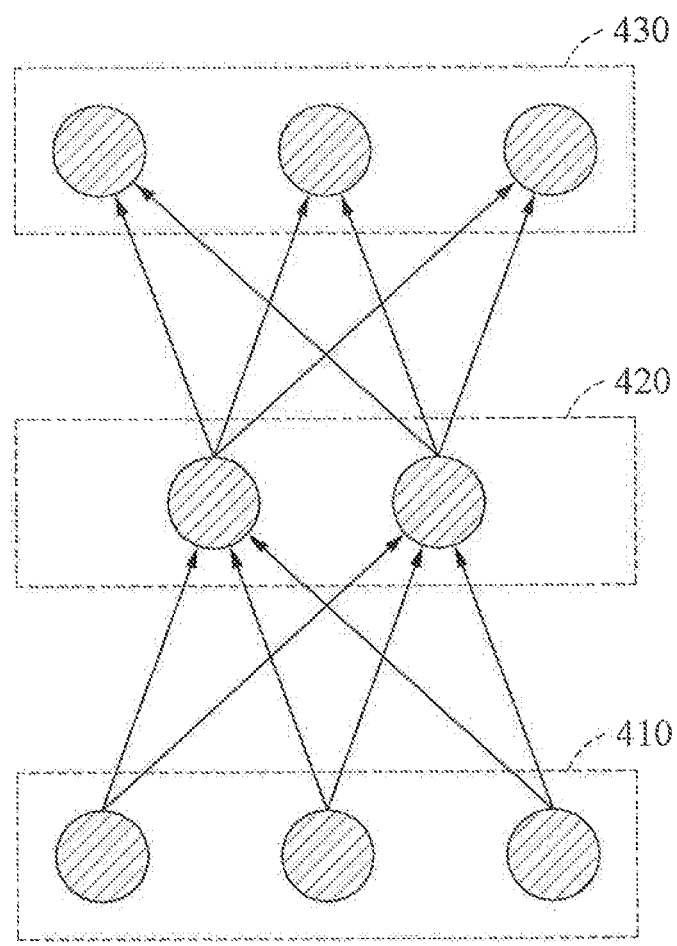
FIG. 4 illustrates an example of a neural network as an object detection model.

FIG. 4 illustrates an example of a neural network 400 as an object detection model.

An object detection model includes, for example, the neural network 400. An object detection apparatus for detecting an object based on the neural network 400 is provided, and a method and apparatus (hereinafter, referred to as an "object detection training apparatus") for training an object detection model, for example, the neural network 400, are provided. In the following description, a recognition includes a verification and an identification. The verification is an operation of determining whether input data is true or false, and the identification is an operation of determining which one of a plurality of labels is indicated by input data.

An example of a structure of the neural network 400 is described below.

The neural network 400 includes a plurality of layers that each include a plurality of nodes. Also, the neural network 400 includes connection weights that connect a plurality of nodes included in one of the plurality of layers to nodes included in another layer. In an example, an object detection training apparatus acquires the neural network 400 from an internal database (DB) stored in a memory, or receives the neural network 400 from an external server via a communicator and acquires the neural network 400.

For example, the neural network 400 is a model designed to perform an arbitrary task using a large number of nodes connected via edges. The neural network 400 is implemented by, for example, hardware, or a combination of software and hardware. The neural network 400 includes nodes, and the nodes are connected to each other via edges with connection weights. A connection weight is a predetermined value of an edge, and is referred to as a "synaptic weight," or a "connection intensity."

The neural network 400 includes a plurality of layers. For example, the neural network 400 includes an input layer 410, a hidden layer 420, and an output layer 430. The input layer 410 receives an input to perform training or recognition, and transfers the input to the hidden layer 420. The output layer 430 generates an output of the neural network 400 based on a signal received from the hidden layer 420. The hidden layer 420 is located between the input layer 410 and the output layer 430, and changes a training input of training data received via the input layer 410 to a value that is relatively more easily predictable.

Each of the input layer 410, the hidden layer 420, and the output layer 430 includes a plurality of nodes. A node included in the input layer 410 is referred to as an "input node," a node included in the hidden layer 420 is referred to as a "hidden node," and a node included in the output layer 430 is referred to as an "output node."

Input nodes included in the input layer 410 and hidden nodes included in the hidden layer 420 are connected to each other via edges with connection weights. Also, hidden nodes included in the hidden layer 420 and output nodes included in the output layer 430 are connected to each other via edges with connection weights.

A neural network includes a plurality of hidden layers, although not shown. The neural network including the plurality of hidden layers is referred to as a "deep neural network (DNN)" Training of the DNN is referred to as "deep learning." For example, when the hidden layer 420 is assumed to include a first hidden layer, a second hidden layer and a third hidden layer, an output of a hidden node included in the first hidden layer is connected to hidden nodes included in the second hidden layer. Also, an output of a hidden node included in the second hidden layer is connected to hidden nodes included in the third hidden layer.

For example, the object detection training apparatus inputs outputs of previous hidden nodes included in a previous hidden layer to each hidden layer via edges with connection weights, and generates outputs of hidden nodes included in each hidden layer based on an activation function and values obtained by applying connection weights to the outputs of the previous hidden nodes. In an example, to transmit an output to a next hidden node, a result of an activation function needs to exceed a threshold of a current hidden node. In this example, a node does not transmit a signal to a next node until reaching a predetermined threshold activation strength through input vectors, and remains in an inactive state.

The object detection training apparatus trains the neural network 400 through supervised learning. The object detection training apparatus is implemented by, for example, a hardware module or a combination of a software module and a hardware module. The supervised learning is a scheme of inputting, to the neural network 400, a training input of training data together with a training output corresponding to the training input and updating connection weights of edges so that output data corresponding to the training output is output. The training data is data including a pair of a training input and a training output. Although the structure of the neural network 400 is expressed as a node structure in FIG. 4, examples are not limited to the node structure. For example, various data structures may be used to store a neural network in a memory storage.

The object detection training apparatus determines parameters of nodes included in a neural network through a gradient descent scheme based on an error that is propagated backwards to the neural network and based on output values of the nodes. For example, the object detection training apparatus updates connection weights between nodes through error backpropagation learning. The error backpropagation learning is a scheme of estimating an error by a forward computation of given training data, propagating the estimated error backwards from an output layer to a hidden layer and an input layer, and updating connection weights to reduce an error. The neural network 400 is processed in an order of the input layer 410, the hidden layer 420, and the output layer 430, however, connection weights are updated in an order of the output layer 430, the hidden layer 420, and the input layer 410 in the error backpropagation learning. For example, at least one processor use a buffer memory configured to store layers or a series of calculation data to process a neural network in a desired direction.

The object detection training apparatus defines an objective function to measure how close currently set connection weights are to an optimal value, continues to change the connection weights based on a result of the objective function, and repeatedly performs training. For example, the objective function is a loss function used to calculate a loss between an expected value to be output and an actual output value based on a training input of training data in the neural network 400. The object detection training apparatus updates the connection weights by reducing a value of the loss function. An example of a loss function is described with reference to FIG. 5 below.

Figure 5:
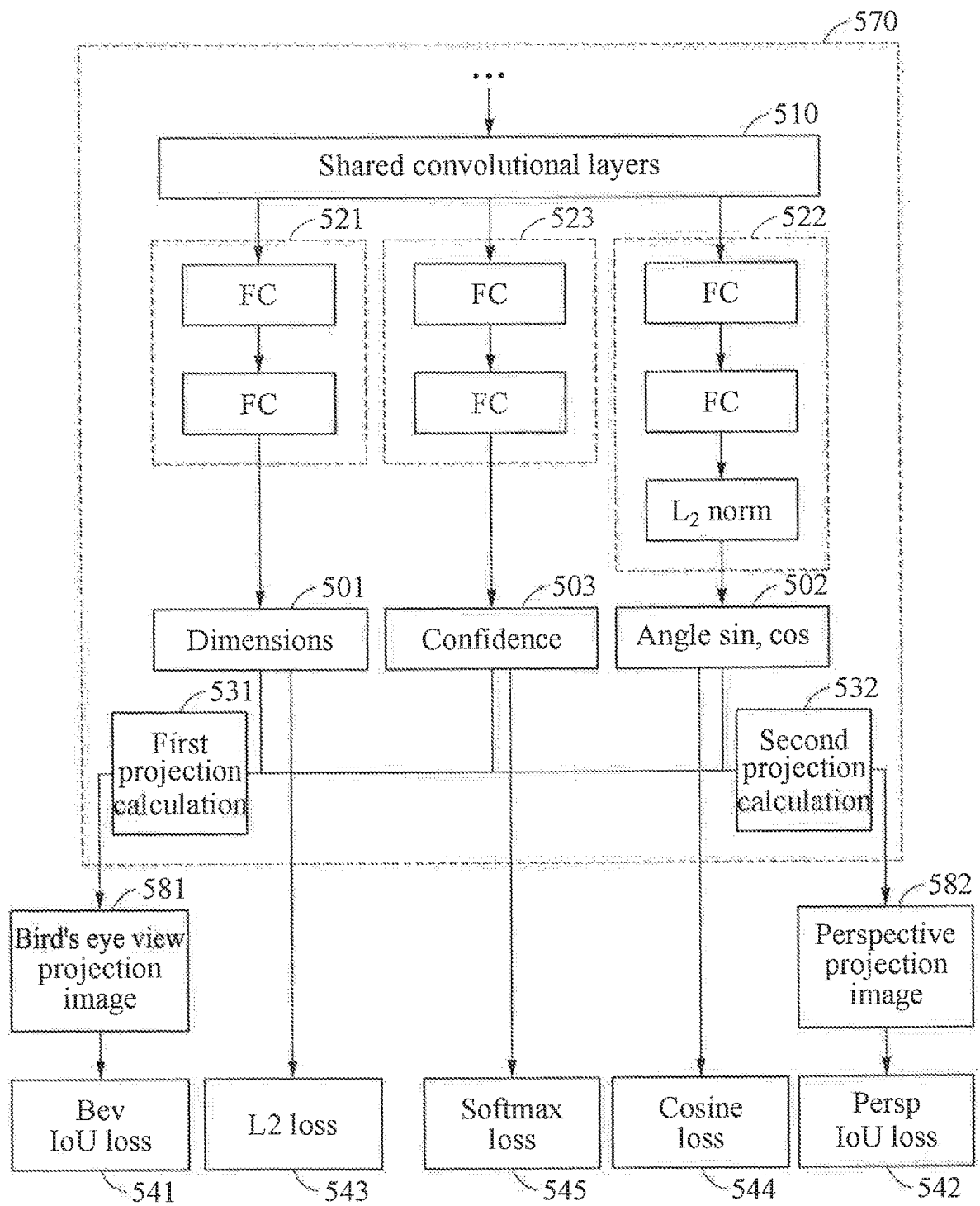
FIG. 5 illustrates an example of an object detection training process.

FIG. 5 illustrates an example of an object detection training process.

An object detection model 570 may include a feature extractor 510 and estimators 521, 522 and 523, and may perform a first projection calculation 531 and a second projection calculation 532.

The feature extractor 510 extracts a feature from an input image. For example, the feature extractor 510 extracts features from a crop image and a bounding box corresponding to an object appearing in the input image. The crop image is resized in a format corresponding to an input layer of the feature extractor 510. The feature extractor 510 includes at least one convolutional layer.

Also, the feature extractor 510 provides the extracted feature to the estimators 521, 522 and 523. The feature extractor 510 is shared by the estimators 521, 522 and 523. The estimators 521, 522 and 523 are, for example, branch networks connected to the feature extractor 510, and have different regression targets.

The estimator 521 estimates a dimension 501 of an object from the feature extracted by the feature extractor 510. The estimator 521 may include at least one fully connected layer that may be referred to as an FC layer.

The estimator 522 estimates a pose 502 of the object from the feature extracted by the feature extractor 510. The pose 502 is represented by, for example, an angle, a sine value and a cosine value that correspond to an orientation of the object. The estimator 522 includes at least one fully connected layer, and performs an L2 norm operation.

The estimator 523 estimates a confidence level 503 of each of the dimension 501 and the pose 502 estimated from the extracted feature. The confidence level 503 is, for example, a score indicating a confidence of each of the dimension 501 and the pose 502 estimated by the estimators 521 and 522 as a numerical value.

FIG. 5 shows the estimators 521, 522 and 523 as branch networks of the feature extractor 510, however, examples are not limited thereto. Also, a number and a type of layers included in the estimators 521, 522 and 523 are not limited.

An object detection training apparatus acquires a bird's eye view projection image 581 from the dimension 501 and the pose 502 through the first projection calculation 531. For example, the object detection training apparatus acquires a 3D bounding box including the object from the dimension 501 and the pose 502, and projects the acquired 3D bounding box to the bird's eye view projection image 581. The object detection training apparatus determines a size and a location of a bird's eye view bounding box projected to the bird's eye view projection image 581. The first projection calculation 531 is, for example, a matrix operation to convert 3D coordinates into 2D coordinates on a first projection image, however, examples are not limited thereto.

The object detection training apparatus acquires a perspective projection image 582 from the dimension 501 and the pose 502 through the second projection calculation 532. For example, the object detection training apparatus calculates a 3D bounding box from the dimension 501 and the pose 502 and projects the 3D bounding box to the perspective projection image 582. The object detection training apparatus determines a size and a location of a perspective bounding box projected to the perspective projection image 582.

Each of a bird's eye view bounding box and a perspective bounding box is a 2D bounding box appearing in a projection image that is a 2D image. For example, the object detection training apparatus converts 3D coordinates of each of points of a 3D bounding box into 2D coordinates of each of projection images, to determine a bird's eye view bounding box and a perspective bounding box.

The object detection training apparatus 200 calculates an output of each of the dimension 501, the pose 502, the bird's eye view projection image 581, and the perspective projection image 582, based on the object detection model 570, from the input image. When training of the object detection model 570 is not completed, the above-described output is a temporary output.

The object detection training apparatus calculates a loss of the object detection model 570 based on a temporary output calculated based on the object detection model 570.

The object detection training apparatus calculates an L2 loss as a loss 543 of the dimension 501. For example, the object detection training apparatus calculates, as a loss, an Euclidean distance between a temporary dimension and a reference dimension. The temporary dimension is calculated from the input image, that is, a training input, and the reference dimension is a training output.

The object detection training apparatus calculates a cosine loss as a loss 544 of the pose 502. For example, the object detection training apparatus calculates a cosine loss corresponding to an angular difference between a temporary orientation and a reference orientation. The temporary orientation corresponds to the pose 502 estimated from the input image, that is, a training input, and the reference orientation is a training output.

The object detection training apparatus calculates a softmax loss as a loss 545 of the confidence level 503.

The object detection training apparatus calculates a bev intersection-over-union (IoU) loss as a loss 541 of the bird's eye view projection image 581. The object detection training apparatus calculates a persp IoU loss as a loss 542 of the perspective projection image 582. An IoU loss is a loss indicating a similarity between a temporary bounding box calculated from a training input and a reference bounding box corresponding to a training output. Examples of a IoU loss will be further described below with reference to FIGS. 7 and 8.

The object detection training apparatus calculates losses for each of the above-described temporary outputs, integrates the losses, and determines a total loss of the object detection model 570. The object detection model 570 updates parameters (for example, connection weights) of the feature extractor 510 and the estimators 521, 522 and 523 until the total loss converges.

The object detection model 570 for which the total loss has converged is, for example, a completely trained model (for example, a neural network). An object detection apparatus performs an object detection based on the completely trained object detection model 570. Also, even when the training is completed, the object detection apparatus additionally trains the object detection model 570 based on a new input image. For example, the object detection apparatus determines, as a training input, a crop image corresponding to a bounding box from the input image, determines, as a training output, a bounding box corresponding to an object, and updates parameters of the object detection model 570.

Figure 6:
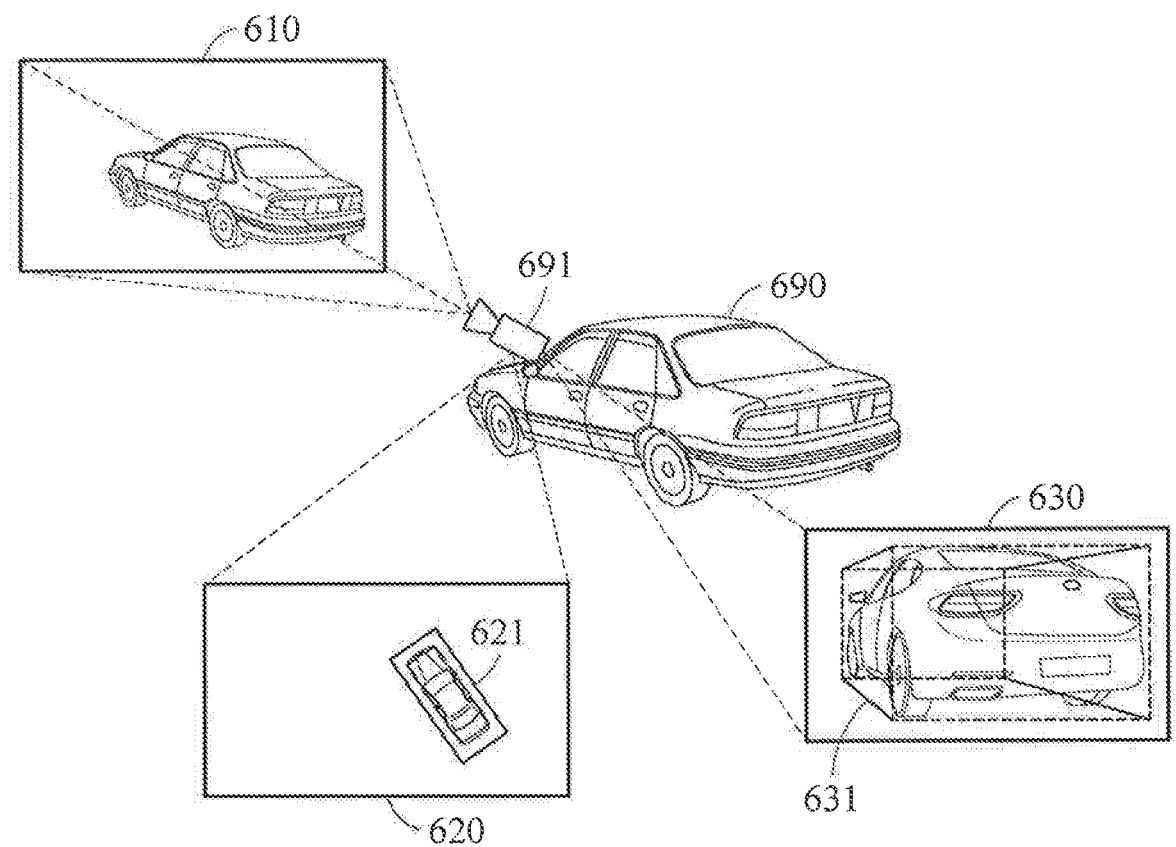
FIG. 6 illustrates an example of a perspective projection image and a bird's eye view projection image.

FIG. 6 illustrates an example of a perspective projection image and a bird's eye view projection image.

An object detection apparatus is installed in a vehicle 690. An object detection apparatus includes a sensor 691, and the sensor 691 is configured to acquire an image 610 representing an object in front of the vehicle 690 including the object detection apparatus. The object detection apparatus generates or acquires information about various viewpoints to estimate a location of the vehicle 690. In an example, the object detection apparatus generates a bird's eye view projection image 620 and a perspective projection image 630 in front of the vehicle 690. In another example, the object detection apparatus generates a bird's eye view projection image 620 and a perspective projection image 630 based on a color image in front of the vehicle 690 and a depth image of a bird's eye view.

The bird's eye view projection image 620 is, for example, a projection image corresponding to a viewpoint (for example, a top view) of an observation at an altitude above a height of a device including the sensor 691. The bird's eye view projection image 620 includes a bird's eye view bounding box 621 corresponding to an object located around the device including the sensor 691. The bird's eye view bounding box 621 is shown as a single box in FIG. 6, however, examples are not limited thereto. For example, a plurality of boxes are detected when a plurality of objects are present.

The perspective projection image 630 is, for example, a projection image corresponding to a viewpoint from which a movement direction of a device including the sensor 691 is observed at an altitude corresponding to the height of the device including the sensor 691. The perspective projection image 630 includes a perspective bounding box 631 corresponding to an object located in the movement direction of the device including the sensor 691. The perspective bounding box 631 is, for example, a 2D bounding box, and includes a front face box and a rear face box.

The object detection training apparatus trains an object detection model based on a loss of the bird's eye view bounding box 621 in the bird's eye view projection image 620 and a loss of the perspective bounding box 631 in the perspective projection image 630, to generate an object detection model configured to accurately estimate a size and a pose of an object. In general, loss is determined by comparing an estimated object pose, dimension and position with reference data. Reference data may also be referred to as ground truth data. Object detection results obtained from various viewpoints are reflected to the object detection model, and thus an accuracy of the object detection model is enhanced.

Although projection images and bounding boxes in a bird's eye view and a prospective view are mainly illustrated in the present disclosure, examples are not limited thereto. Accordingly, an object detection model is trained based on losses by a projection image and a bounding box in other views. Also, the object detection model is trained based on losses by projection images and bounding boxes in a plurality of viewpoints.

Figure 7:
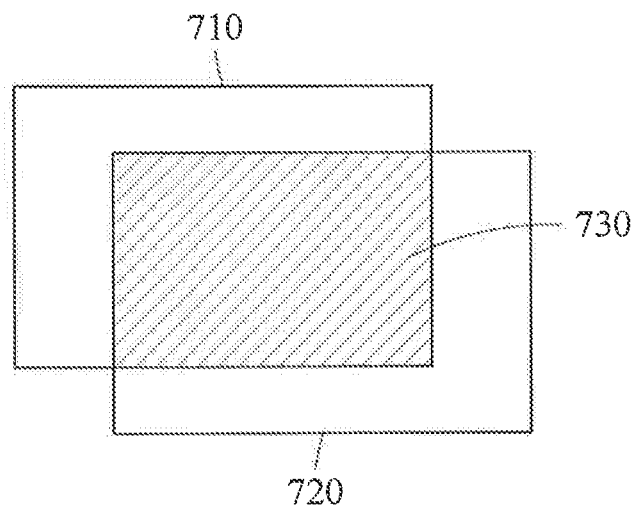
FIG. 7 illustrates an example of an intersection-over-union (IoU).

FIG. 7 illustrates an example of an IoU.

An object detection training apparatus calculates, based on an IoU, a loss of a bounding box corresponding to an object detected from a projection image corresponding to each viewpoint. A measure known as IoU corresponds to a ratio of an intersection area to a union area, see FIG. 7. The IoU is an indicator indicating a degree of overlap between an output bounding box and a reference bounding box, and represents, for example, a value obtained by dividing an area of an intersection region 730 between two regions by an area of a union region.

For example, the object detection training apparatus determines an output bounding box 710 corresponding to an object from an input image, with respect to a projection image corresponding to an arbitrary viewpoint. The object detection training apparatus compares the output bounding box 710 to a reference bounding box 720. The reference bounding box 720 is a training output paired with the input image, that is, a training input, and is, for example, ground truth data. The object detection training apparatus determines an IoU loss based on the value obtained by dividing the area of the intersection region 730 between the output bounding box 710 and the reference bounding box 720 by the area of the union region. For example, the object detection training apparatus updates parameters of an object detection model so that the area of the intersection region 730 converges to the area of the union region. When a value of an IoU approaches "1", a similarity between the output bounding box 710 and the reference bounding box 720 increases.

The object detection training apparatus calculates a loss of a first output bounding box based on a degree of overlap between the first output bounding box and a first reference bounding box. Also, the object detection training apparatus calculates a loss of a second output bounding box based on a degree of overlap between the second output bounding box and a second reference bounding box. However, a temporary output is not limited to the first output bounding box and the second output bounding box only, and at least one output bounding box 710 is used to calculate a loss.

Figure 8:
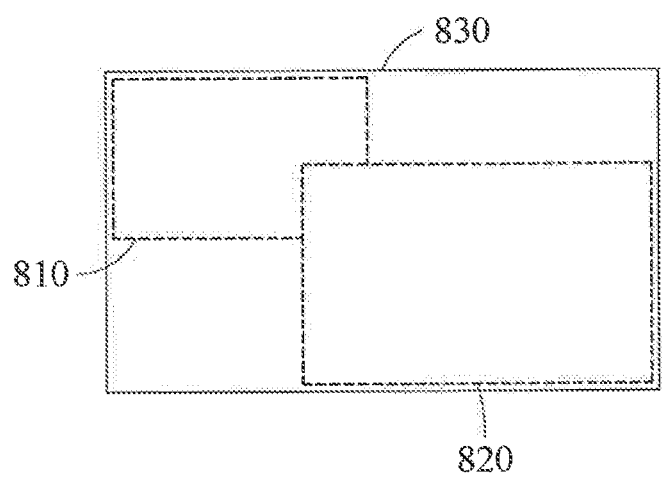
FIG. 8 illustrates an example of a perspective bounding box.

FIG. 8 illustrates an example of a perspective bounding box.

A perspective bounding box is a 2D bounding box, and includes a front face box 810 and a rear face box 820. The perspective bounding box is, for example, a box obtained by projecting a 3D bounding box to a perspective projection image corresponding to a perspective view. For example, the perspective bounding box is a box obtained by converting 3D coordinates of a 3D bounding box corresponding to an object into 2D coordinates of a perspective projection image. For example, the front face box 810 of the perspective bounding box is a box obtained by converting 3D coordinates of four points corresponding to a front face of the 3D bounding box into 2D coordinates on the perspective projection image. The rear face box 820 of the perspective bounding box is a box obtained by converting 3D coordinates of four points corresponding to a rear face of the 3D bounding box into 2D coordinates on the perspective projection image.

An object detection training apparatus defines a new reference box for an IoU calculation, to calculate a loss of the perspective bounding box. For example, the object detection training apparatus determines a target box 830 based on the front face box 810 and the rear face box 820 from a perspective bounding box that is acquired by a second projection calculator and that corresponds to an object. The front face box 810 and the rear face box 820 indicate a front face and a rear face of the object, respectively. The object detection training apparatus determines, as the target box 830, a box that has a minimum region and that includes the front face box 810 and the rear face box 820. The target box 830 is used as the output bounding box 710 described above with reference to FIG. 7.

Thus, the object detection training apparatus calculates a loss of the perspective bounding box based on a degree of overlap between the target box 830 and a reference box.

Figure 9:
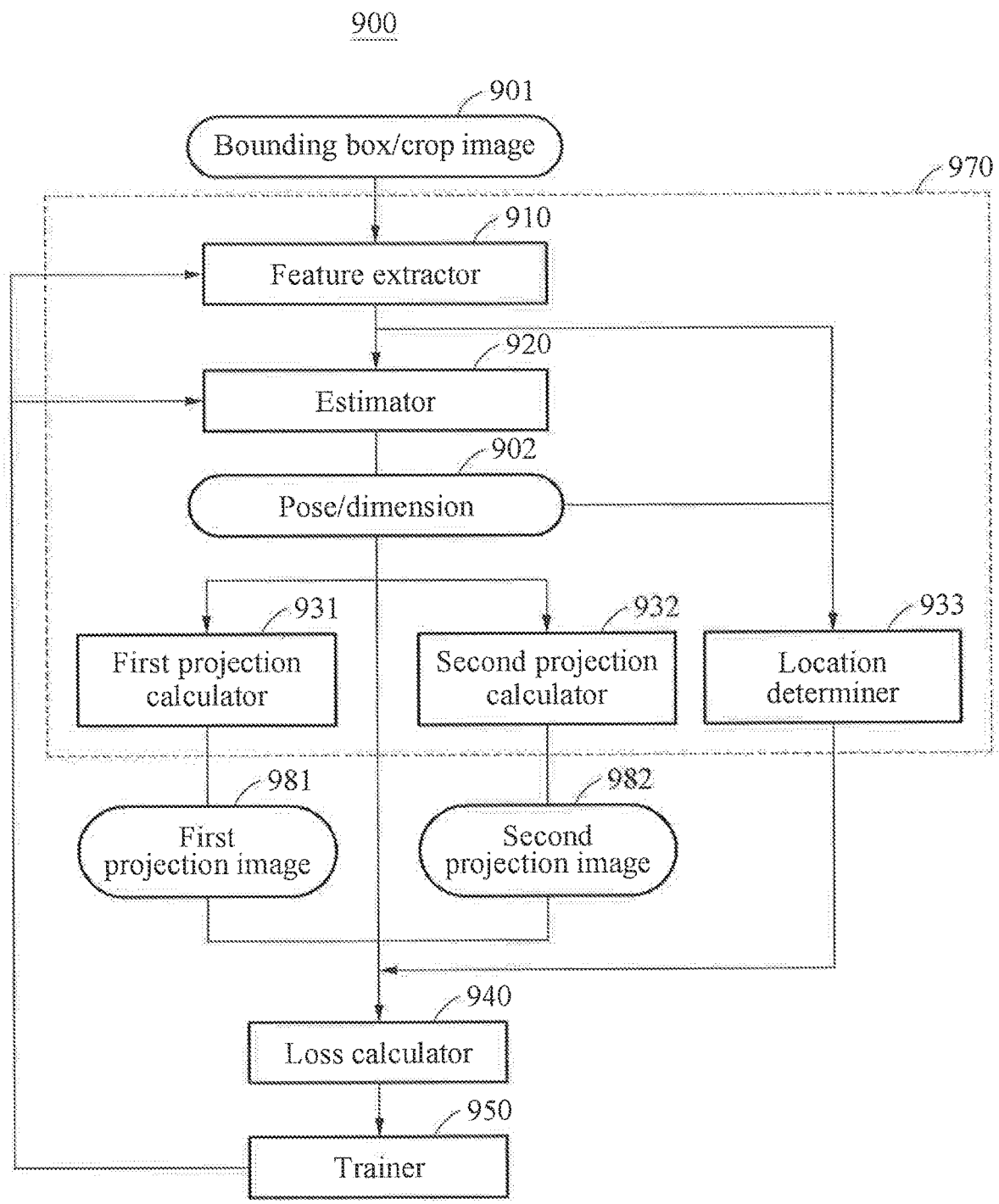
FIG. 9 is a block diagram illustrating another example of an object detection training apparatus.

FIG. 9 is a block diagram illustrating an example of an object detection training apparatus 900.

The object detection training apparatus 900 further includes a location determiner 933 in addition to a structure of FIG. 2. Thus, the object detection model 970 further includes a branch network configured to determine a location.

A feature extractor 910 extracts an abstracted feature from a bounding box and crop image 901. An estimator 920 estimates a pose and dimension 902 of an object from the extracted feature. A first projection calculator 931 determines a first projection image 981 from the pose and dimension 902. A second projection calculator 932 determines a second projection image 982 from the pose and dimension 902.

The location determiner 933 determines a location of the object from the extracted feature and the pose and dimension 902. For example, the location determiner 933 determines a relative distance from a sensor to the object. The location determiner 933 estimates a location offset from the extracted feature. The location offset is, for example, an offset representing an error predicted for an initial location. The location determiner 933 estimates an initial location from a dimension and a pose. The location determiner 933 determines an output location by applying the location offset to the initial location. Thus, the location determiner 933 corrects an initial location result estimated from the pose and dimension 902 of the object, to determine a more accurate location of the object.

A loss calculator 940 calculates a loss corresponding to each of the pose and dimension 902, the first projection image 981, the second projection image 982, and the output location.

A trainer 950 trains an object detection model 970 based on the calculated loss. For example, the trainer 950 updates parameters of the object detection model 970 so that the calculated loss converges to an arbitrary value.

Figure 10:
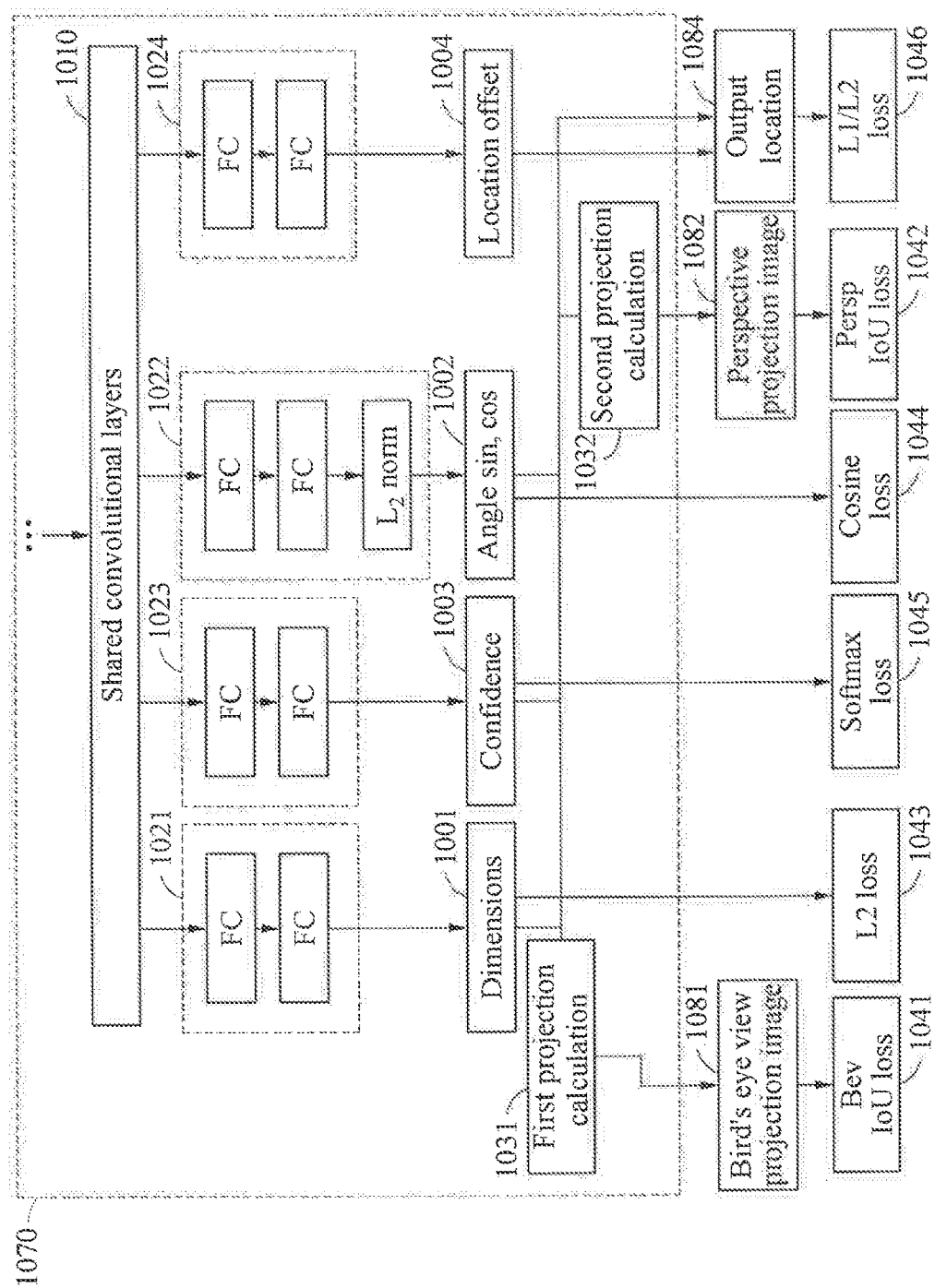
FIG. 10 illustrates another example of an object detection training process.

FIG. 10 illustrates another example of an object detection training process.

Similarly to FIG. 5, an object detection model 1070 may include a feature extractor 1010 and estimators 1021, 1022 and 1023, and may perform a first projection calculation 1031 and a second projection calculation 1032. Also, the object detection model 1070 may further include a location estimator 1024.

The feature extractor 1010 extracts a feature from a bounding box and crop image corresponding to an object appearing in the input image. The feature extractor 1010 includes at least one convolutional layer. The feature extractor 1010 is connected to branch networks, for example, a plurality of estimators and the location estimator 1024, and branch networks have different regression targets.

The estimator 1021 estimates a dimension 1001 of the object from the feature extracted by the feature extractor 1010, and may include a fully connected layer. The estimator 1022 estimates a pose 1002 of the object from the extracted feature. The estimator 1022 may include a fully connected layer and performs an L2 norm operation. An example of an L2 norm operation is that of calculating the distance between two vectors. Algebraically, for example, the scalar d is found as $d=|(x-y)|$ where x and y are vectors and "$|(\ )|$" indicates a norm operation. The estimator 1023 estimates a confidence level 1003 of each of the dimension 1001 and the pose 1002, and includes a fully connected layer. In general, a confidence level may a be a probability that a hypothesis is correct.

An object detection training apparatus acquires a bird's eye view projection image 1081 from the dimension 1001 and the pose 1002 through the first projection calculation 1031, and acquires a perspective projection image 1082 through the second projection calculation 1032.

The location estimator 1024 estimates a location offset 1004 from the extracted feature. The object detection training apparatus estimates an initial location from the dimension 1001 and the pose 1002, applies the location offset 1004 to the initial location, and determines an output location 1084.

The object detection training apparatus calculates a temporary output of each of the dimension 1001, the pose 1002, the bird's eye view projection image 1081, the perspective projection image 1082 and the output location 1084, from the input image based on the object detection model 1070. The object detection training apparatus individually calculates losses for each temporary output, integrates the losses, and determines a total loss.

The object detection training apparatus calculates a bev IoU loss as a loss 1041 of the bird's eye view projection image 1081, calculates a persp IoU loss as a loss 1042 of the perspective projection image 1082, calculates an L2 loss as a loss 1043 of the dimension 1001, calculates a cosine loss as a loss 1044 of the pose 1002, calculates a softmax loss as a loss 1045 of the confidence level 1003, and calculates an L1 or L2 loss as a loss 1046 of the output location 1084. For example, the object detection training apparatus calculates an Euclidian distance between a value obtained by adding the location offset 1004 to the initial location and a ground truth value as the loss 1046 of the output location 1084.

The object detection training apparatus updates parameters (for example, connection weights) of the feature extractor 1010 and estimators 1021, 1022 and 1023 until the total loss of the object detection model 1070 converges. Also, even when training is completed, the object detection training apparatus calculates a temporary output of the object detection model 1070 in response to an acquisition of a new input image, and reupdates parameters of the object detection model 1070 so that a loss of the temporary output converges.

Thus, the object detection training apparatus trains the object detection model 1070 on a complex effect on a form of a projection object by a location, a pose and a size of an object when a 3D object is projected to a projection image. Also, the object detection training apparatus applies a location offset to an initial location value estimated as a discrete value, to determine an output location indicating a continuous value.

Figure 11:
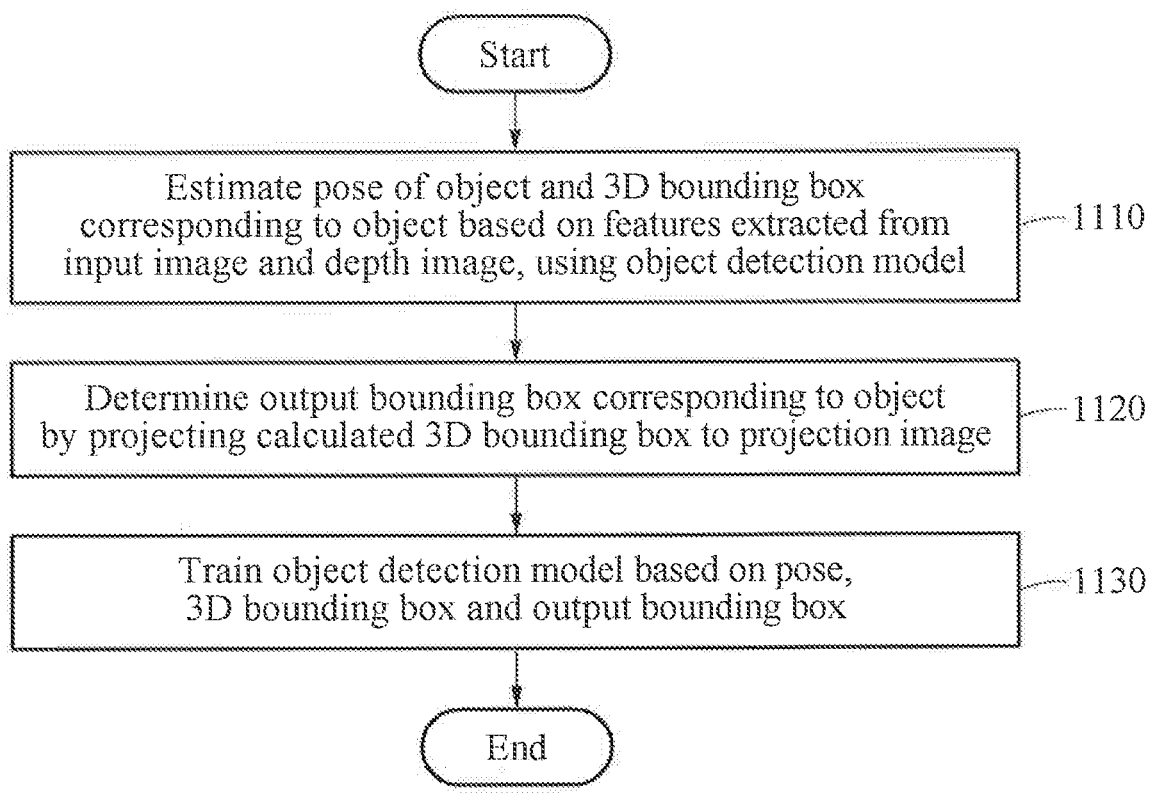
FIG. 11 is a flowchart illustrating another example of an object detection training method.

FIG. 11 is a flowchart illustrating another example of an object detection training method.

In operation 1110, an object detection training apparatus estimates a pose of an object and a 3D bounding box corresponding to the object based on features extracted from an input image and a depth image, using an object detection model. The object detection training apparatus extracts features based on a region calculated by a region proposal network (RPN) from the input image and the depth image. The RPN is a network that proposes a region in which an object is expected to exist in a space corresponding to a field of view (FOV) of a sensor, and will be further described below with reference to FIG. 13.

In operation 1120, the object detection training apparatus determines an output bounding box corresponding to the object by projecting the calculated 3D bounding box to a projection image. For example, the object detection training apparatus determines a perspective bounding box corresponding to the object by projecting the calculated 3D bounding box to a perspective projection image.

In operation 1130, the object detection training apparatus trains a feature extractor and an estimator based on the pose, the 3D bounding box and the output bounding box. The object detection training apparatus calculates a loss based on the pose, the 3D bounding box and the output bounding box. The object detection training apparatus trains the object detection model based on the calculated loss. The training algorithm may use a gradient descent method.

Figure 12:
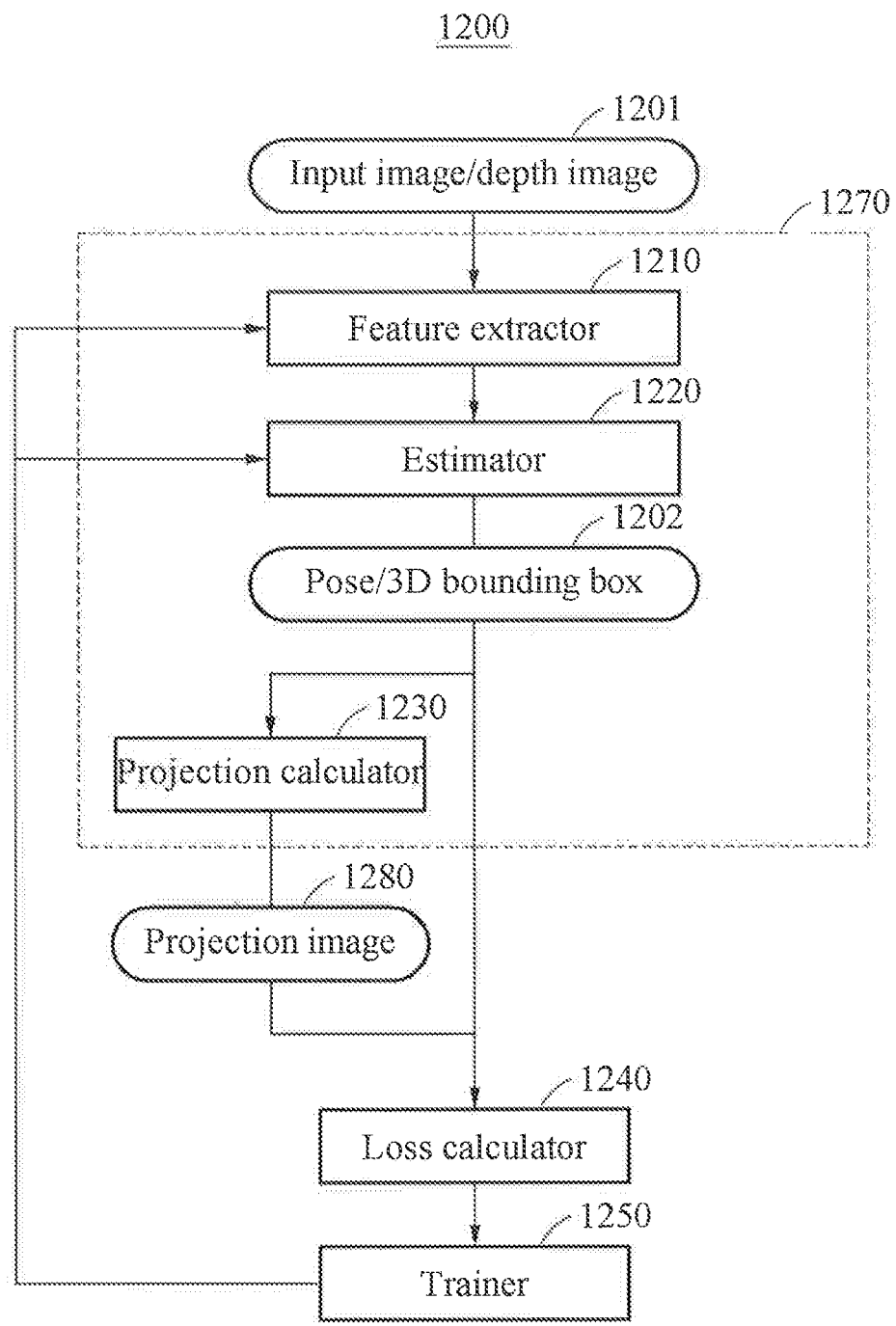
FIG. 12 illustrates another example of an object detection training apparatus.

FIG. 12 illustrates an example of an object detection training apparatus 1200.

The object detection training apparatus 1200 includes a feature extractor 1210, an estimator 1220, a projection calculator 1230, a loss calculator 1240, and a trainer 1250. The object detection model 1270 may include the feature extractor 1210, the estimator 1220, and the projection calculator 1230.

The feature extractor 1210 extracts a feature from an input image and depth image 1201. An input image is, for example, a color image acquired based on a camera sensor. A depth image is, for example, an image representing a distance to a target point corresponding to each pixel acquired based on a LiDAR sensor. The depth image corresponds to a bird's eye view. An example of the feature extractor 1210 will be further described below with reference to FIG. 13.

The estimator 1220 estimates a pose and 3D bounding box 1202 corresponding to an object from the extracted feature. For example, the estimator 1220 estimates a location (for example, 3D coordinates) of a point that defines a 3D bounding box, based on the extracted feature.

The projection calculator 1230 determines a projection image 1280 by projecting a 3D bounding box at an arbitrary viewpoint. For example, the projection calculator 1230 determines a perspective bounding box by projecting a 3D bounding box to the projection image 1280 corresponding to a perspective view. The projection calculator 1230 includes a matrix operation to convert each 3D point of the 3D bounding box into a 2D point on the projection image 1280.

The loss calculator 1240 calculates a loss corresponding to each of the pose and 3D bounding box 1202, and the projection image 1280.

The trainer 1250 trains the object detection model 1270 based on the calculated loss. For example, the trainer 1250 updates parameters of the object detection model 1270 so that the calculated loss converges.

Figure 13:
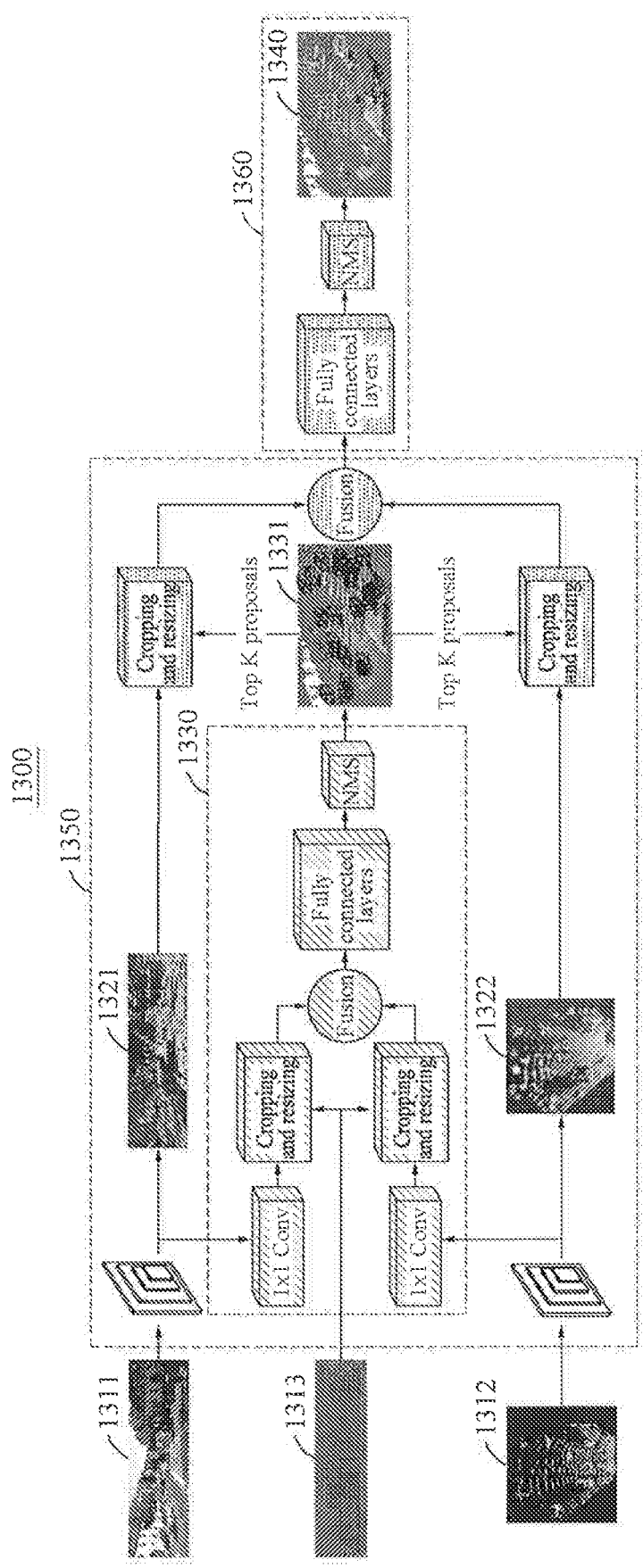
FIG. 13 illustrates an example of a feature extraction process.

FIG. 13 illustrates an example of a feature extraction process.

FIG. 13 illustrates a portion of an object detection model 1300, and the object detection model 1300 includes a feature extractor 1350, and a branch network corresponding to an estimator 1360 that is configured to estimate a 3D bounding box.

The feature extractor 1350 extracts features from an input image 1311 and a depth image 1312. For example, the feature extractor 1350 includes an RPN 1330, and extracts a feature corresponding to a region proposed by the RPN 1330.

For example, the feature extractor 1350 calculates an input feature map 1321 from the input image 1311 through a convolutional layer. The feature extractor 1350 calculates a depth feature map 1322 from the depth image 1312 through a convolutional layer. The RPN 1330 proposes a region with a relatively high probability that a detected object exists, based on the input feature map 1321, the depth feature map 1322, and a 3D anchor grid 1313.

The input feature map 1321 is data obtained by abstracting a visual feature of the input image 1311. The depth feature map 1322 is data obtained by abstracting a visual feature of the depth image 1312.

The 3D anchor grid 1313 is, for example, a grid indicating a space corresponding to an FOV of a sensor (for example, an image sensor, or a LiDAR sensor). The 3D anchor grid 1313 is a grid of a predetermined resolution (for example, 0.1 m). The 3D anchor grid 1313 includes an anchor box that is set to detect an object in a space corresponding to an FOV of a sensor. The anchor box is, for example, a bounding box template to express a probability that an object exists in the space corresponding to the FOV of the sensor. The anchor box is, for example, a 3D bounding box. For example, the anchor box is located in regions of the 3D anchor grid 1313 that a user desires to observe a probability that an object exists. A shape, a size, and a pose of the anchor box and a number of anchor boxes vary depending on a design.

The RPN 1330 calculates a probability that an object detected from the input image 1311 or the depth image 1312 is included in one of a plurality of anchor boxes arranged in the 3D anchor grid 1313. The RPN 1330 includes a convolutional layer, a crop and resizing operation, fully connected layers, and non-maximum suppression (NMS) operation, as shown in FIG. 13, however, examples are not limited thereto. Also, the RPN 1330 proposes an anchor box in the 3D anchor grid 1313 with a relatively high probability that an object exists. The RPN 1330 proposes top "K" anchor boxes 1331 in an order of probabilities that an object exists, and K is an integer greater than or equal to "1."

The feature extractor 1350 performs cropping and resizing to obtain a portion of an input feature map 1321 corresponding to the top "K" anchor boxes proposed by the RPN 1330. Also, the feature extractor 1350 performs cropping and resizing to obtain a portion of the depth feature map 1322 corresponding to the top "K" anchor boxes proposed by the RPN 1330. The feature extractor 1350 extracts a feature by fusing a feature obtained by cropping the input feature map 1321 and a feature obtained by cropping the depth feature map 1322.

The estimator 1360 includes fully connected layers and an NMS operation, and estimates a location of a 3D bounding box 1340 corresponding to an object from the feature extracted by the feature extractor 1350. The object detection training apparatus trains the object detection model 1300 so that the estimated location of the 3D bounding box 1340 converges to a location of a ground truth box.

The object detection training apparatus classifies individual anchor boxes of the 3D anchor grid 1313 as a positive anchor box and a negative anchor box based on a degree of overlap between a proposed anchor box and a ground truth 3D box in a bird's eye view projection image. For example, the object detection training apparatus trains the RPN 1330 based on a degree of overlap between an anchor box proposed by the RPN 1330 and a ground truth box in a bird's eye view. In this example, when the degree of the overlap between the proposed anchor box and the ground truth box is greater than a first threshold, the object detection training apparatus trains the RPN 1330 so that the anchor box outputs a positive value (for example, "1"). When the degree of the overlap between the proposed anchor box and the ground truth box is less than a second threshold, the object detection training apparatus trains the RPN 1330 so that the anchor box outputs a negative value (for example, "0").

Thus, the object detection training apparatus classifies each of anchor boxes as a positive anchor box and a negative anchor box, based on both a degree of overlap between a ground truth box and an estimated box in a bird's eye view, and a degree of overlap between a ground truth box and an estimated box in a perspective view. The anchor boxes correspond to a training output in response to a training input (for example, the input image 1311 and the depth image 1312). The object detection training apparatus trains the RPN 1330 to output a given training output (for example, an output of a positive anchor box and a negative anchor box) in response to inputs of the input image 1311 and the depth image 1312. The object detection training apparatus accurately classifies anchor boxes of a 3D anchor grid as a positive anchor box and a negative anchor box, and thus it is possible to reduce an unnecessary region proposal and a number of operations.

The feature extracted by the feature extractor 1350 is used to calculate a pose of an object or a perspective projection image, which will be further described below with reference to FIG. 14.

Figure 14:
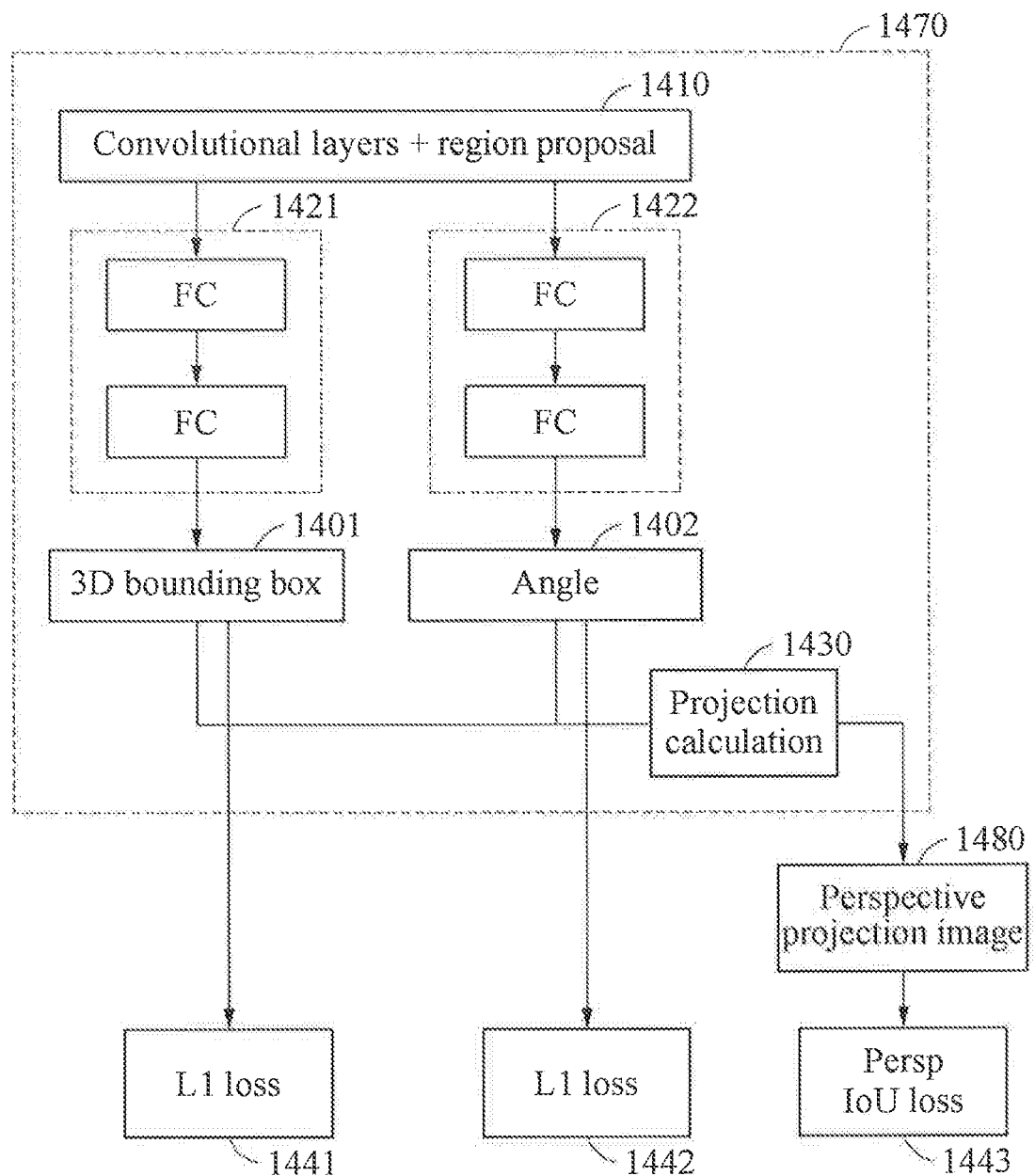
FIG. 14 illustrates another example of an object detection training process.

FIG. 14 illustrates another example of an object detection training process.

An object detection model 1470 may include a feature extractor 1410 and estimators 1421 and 1422, and may perform a projection calculation 1430.

The feature extractor 1410 extracts features from an input image and a depth image, as described above in FIG. 13. For example, the feature extractor 1410 extracts a feature corresponding to an anchor box (for example, an anchor box determined as a positive anchor box) that is predicted to include an object in a space corresponding to an FOV of a sensor, from the input image and the depth image. The feature extractor 1410 is connected to a branch network, for example, the estimators 1421 and 1422.

The estimator 1421 estimates a 3D bounding box 1401 from the features extracted by the feature extractor 1410. For example, the estimator 1421 recursively estimates 3D coordinates of each of points (for example, vertices) of the 3D bounding box 1401 corresponding to an object. The estimator 1421 includes at least one fully connected layer.

The estimator 1422 estimates an angle 1402 from the features extracted by the feature extractor 1410. For example, the estimator 1422 estimates an angle 1402 corresponding to an orientation of an object. The estimator 1422 includes at least one fully connected layer.

An object detection training apparatus acquires a perspective projection image 1480 from the 3D bounding box 1401 through the projection calculation 1430. For example, the object detection training apparatus determines a size and a location of a perspective bounding box projected to the perspective projection image 1480. The projection calculation 1430 includes a matrix operation to convert 3D coordinates into 2D coordinates on the perspective projection image 1480, however, examples are not limited thereto.

The object detection training apparatus calculates as outputs of the 3D bounding box 1401, the angle 1402 and the perspective projection image 1480. These calculations are based on the input image and the depth image based on the object detection model 1470.

The object detection training apparatus calculates a total loss of the object detection model 1470 based on the above-described temporary output calculated based on the object detection model 1470. For example, the object detection training apparatus calculates an L2 loss as a loss 1441 of the 3D bounding box 1401. Also, the object detection training apparatus calculates an L1 loss as a loss 1442 of the angle 1402. The object detection training apparatus calculates a persp IoU loss as a loss 1443 of the perspective projection image 1480. The object detection training apparatus calculates a loss of an output bounding box based on a degree of overlap between the output bounding box and a reference bounding box. The IoU loss has been described above with reference to FIG. 7, and accordingly further description thereof is not repeated.

The object detection training apparatus calculates losses for each of the above-described temporary outputs, integrates the losses, and determines the total loss of the object detection model 1470. The object detection model 1470 updates parameters (for example, connection weights) of the feature extractor 1410 and estimators 1421 and 1422 so that the total loss converges.

Figure 15:
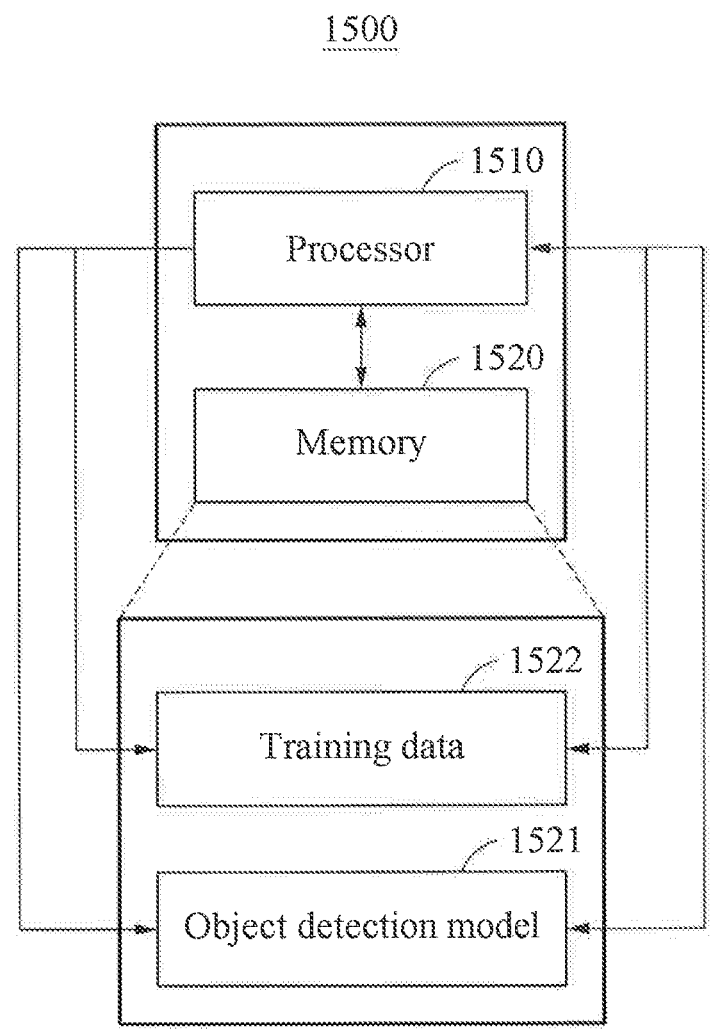
FIG. 15 is a block diagram illustrating an example of a configuration of an object detection training apparatus.

FIG. 15 is a block diagram illustrating an example of a configuration of an object detection training apparatus 1500.

The object detection training apparatus 1500 includes a processor 1510 and a memory 1520.

The processor 1510 estimates a pose and a dimension of an object based on a feature extracted from an input image, using an object detection model 1521. The processor 1510 determines a first output bounding box corresponding to the object by projecting a 3D bounding box calculated from the pose and the dimension to a first projection image. The processor 1510 determines a second output bounding box corresponding to the object by projecting the calculated 3D bounding box to a second projection image. The processor 1510 trains the object detection model 1521 based on the pose, the dimension, the first output bounding box and the second output bounding box. An operation of the processor 1510 is not limited thereto, and the processor 1510 may perform at least one of the operations described above with reference to FIGS. 1 through 14.

The memory 1520 stores the object detection model 1521. The object detection model 1521 is a completely trained model, and includes, for example, the object detection model 570 of FIG. 5, the object detection model 1070 of FIG. 10, or the object detection model 1470 of FIG. 14. Parameters of the object detection model 1521 are updated by the processor 1510 even when training is completed.

The memory 1520 further includes training data 1522. The training data 1522 includes a pair of a training input and a training output. In an example, when the training input is an input image, the training output includes a ground truth bounding box, a dimension, a location and a pose of an object appearing in a corresponding image. In another example, when the training input includes an input image and a depth image, the training output includes a ground truth 3D bounding box and a ground truth pose of an object.

Figure 16:
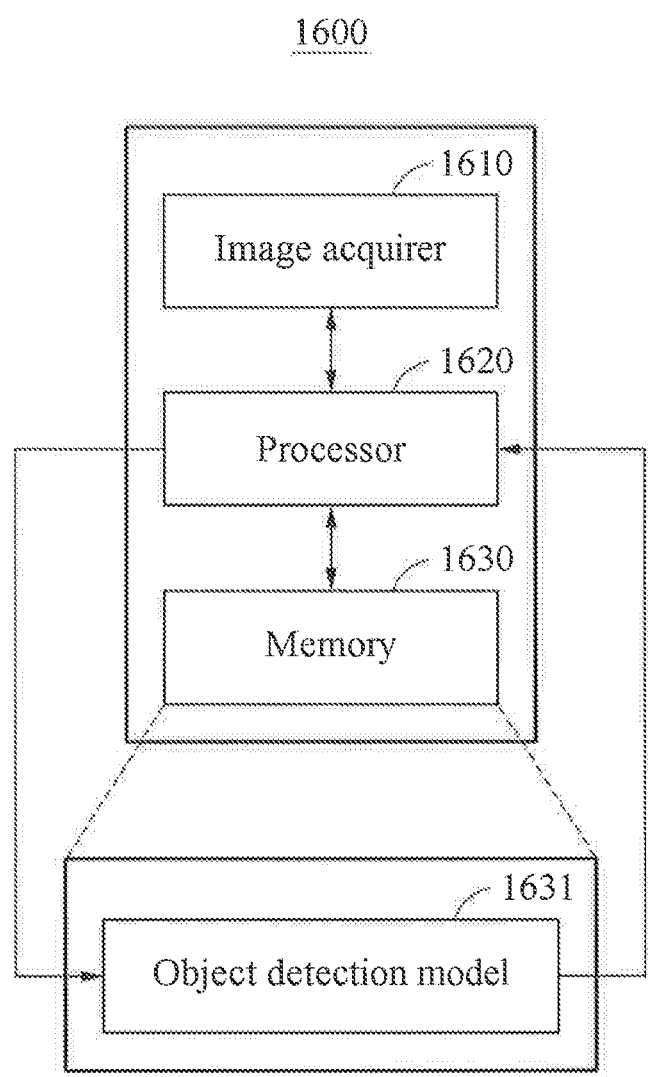
FIG. 16 is a block diagram illustrating an example of a configuration of an object detection apparatus.

FIG. 16 is a block diagram illustrating an example of a configuration of an object detection apparatus 1600.

The object detection apparatus 1600 includes an image acquirer 1610, a processor 1620, and a memory 1630.

The image acquirer 1610 includes a sensor. The sensor includes, for example, a camera sensor and a depth sensor. The depth sensor is, for example, a LiDAR sensor. When the object detection apparatus 1600 is installed in a vehicle, an image sensor and a LiDAR sensor are installed in a front side and a top side of the vehicle, respectively.

The processor 1620 detects an object that is located in front of the vehicle from at least one of an input image and a depth image, based on an object detection model 1631. For example, the processor 1620 estimates a location and a size of a bounding box corresponding to the object, based on the object detection model 1631 that is completely trained. The object detection model 1631 includes, for example, the object detection model 570 of FIG. 5, the object detection model 1070 of FIG. 10, or the object detection model 1470 of FIG. 14. Also, in response to an acquisition of at least one of a new input image and a new depth image, the processor 1620 retrains the object detection model 1631 based on an acquired image.

The memory 1630 stores the object detection model 1631. For example, the memory 1630 stores the object detection model 1631 that is completely trained.

The object detection training apparatuses 200, 900, 1200, and 1500, the object detection apparatus 1600, and other apparatuses, units, modules, devices, and other components described herein with respect to FIGS. 2, 9, 12, 15 and 16 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3 and 11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An object detection training method comprising:
    estimating a pose and a dimension of an object based on a feature extracted from an input image, using an object detection model;
    calculating a three-dimensional (3D) bounding box from the pose and the dimension;
    determining a first output bounding box corresponding to the object by projecting the 3D bounding box to a first projection image;
    determining a second output bounding box corresponding to the object by projecting the 3D bounding box to a second projection image; and
    training the object detection model based on the pose, the dimension, the first output bounding box and the second output bounding box, the training comprising a fusion operation over the first output bounding box and the second output bounding box,
    wherein the training of the object detection model comprises:
        calculating a loss based on the pose, the dimension, the first output bounding box and the second output bounding box, and
    wherein the calculating of the loss comprises:
        calculating a first loss based on a degree of overlap between the first output bounding box and a first reference bounding box; and
        calculating a second loss based on a degree of overlap between the second output bounding box and a second reference bounding box.

2. The object detection training method of claim 1, wherein the determining of the first output bounding box comprises determining a bird's eye view bounding box corresponding to the object by projecting the 3D bounding box to a bird's eye view projection image.

3. The object detection training method of claim 1, wherein the determining of the second output bounding box comprises determining a perspective bounding box corresponding to the object by projecting the 3D bounding box to a perspective projection image.

4. The object detection training method of claim 1, wherein the estimating of the pose and the dimension of the object comprises extracting features from i) a two-dimensional (2D) bounding box corresponding to the object detected from the input image and ii) a crop image corresponding to the 2D bounding box.

5. The object detection training method of claim 1, wherein the training of the object detection model comprises:
    training the object detection model based on the loss, the training comprising updating weights in a neural network.

6. The object detection training method of claim 5, wherein the calculating of the loss comprises:
    determining a target box based on a front face box indicating a front face of the object; and
    calculating a loss of a perspective bounding box based on a degree of overlap between the target box and a reference box.

7. The object detection training method of claim 5, wherein
    the estimating of the pose and the dimension of the object comprises:
    estimating a location offset based on the feature extracted from the input image;
    estimating an initial location from the pose and the dimension;
    determining an output location by applying the location offset to the estimated initial location; and
    the calculating the loss is based on the determined output location.

8. The object detection training method of claim 1, wherein the estimating of the pose and the dimension comprises estimating a confidence level of each of the estimated pose and the estimated dimension based on the feature extracted from the input image.

9. The object detection training method of claim 1, wherein the estimating of the dimension of the object comprises estimating a width, a length and a height of the object.

10. The method of claim 1, wherein the fusion operation over the first output bounding box and the second output bounding box comprises extracting a feature by identifying a feature obtained both by cropping the first output bounding box and obtained by cropping the second output bounding box.

11. An object detection training method comprising:
    estimating, using an object detection model, a pose of an object based on features extracted from both an input image and a depth image;
    estimating a three-dimensional (3D) bounding box corresponding to the object based on the features extracted from both the input image and the depth image, using the object detection model;
    determining an output bounding box corresponding to the object by projecting the 3D bounding box to a projection image; and
    training the object detection model based on the pose, the 3D bounding box and the output bounding box, the training comprising a fusion operation over the 3D bounding box and the output bounding box,
    wherein the training of the object detection model comprises:
        calculating a loss based on the pose, the 3D bounding box and the output bounding box, and
    wherein the calculating of the loss comprises:
        calculating a loss of the output bounding box based on a degree of overlap between the output bounding box and a reference bounding box.

12. The object detection training method of claim 11, wherein the determining of the output bounding box comprises determining a perspective bounding box corresponding to the object by projecting the 3D bounding box to a perspective projection image.

13. The object detection training method of claim 11, wherein the extracting the features from both the input image and the depth image is based on a region calculated by a region proposal network (RPN).

14. The object detection training method of claim 11, wherein the training of the object detection model comprises:
    training the object detection model based on the loss, the training comprising updating weights in a neural network.

15. The object detection training method of claim 14, wherein the calculating of the loss comprises:
    determining, from a perspective bounding box corresponding to the object, a target box based on a front face box indicating a front face of the object; and
    calculating a loss of the perspective bounding box based on a degree of overlap between the target box and a reference box.

16. The object detection training method of claim 11, wherein the estimating of the pose and the 3D bounding box comprises estimating a location of a point that at least partially defines the 3D bounding box.

17. The object detection training method of claim 11, wherein the estimating of the pose and the 3D bounding box is based on a depth image corresponding to a bird's eye view.

18. An object detection training apparatus comprises:
    a memory configured to store an object detection model; and
    a processor configured to:
        estimate a pose and a dimension of an object based on a feature extracted from an input image, using the object detection model,
        calculate a three-dimensional (3D) bounding box from the pose and the dimension,
        determine a first output bounding box corresponding to the object by projecting the 3D bounding box to a first projection image,
        determine a second output bounding box corresponding to the object by projecting the 3D bounding box to a second projection image, and
        train the object detection model based on the pose, the dimension, the first output bounding box and the second output bounding box, and further based on a fusion operation over the first output bounding box and the second output bounding box,
    wherein the processor is further configured to train the object detection model by:
        calculating a loss based on the pose, the dimension, the first output bounding box and the second output bounding box, and wherein the processor is further configured to calculate the loss by:
  calculating a first loss based on a degree of overlap between the first output bounding box and a first reference bounding box; and
  calculating a second loss based on a degree of overlap between the second output bounding box and a second reference bounding box.

* * * * *